US009652675B2

(12) United States Patent
Kannan et al.

(10) Patent No.: US 9,652,675 B2
(45) Date of Patent: May 16, 2017

(54) IDENTIFYING PRESENTATION STYLES OF EDUCATIONAL VIDEOS

(71) Applicant: Microsoft Technology Licensing, LLC, Redmond, WA (US)

(72) Inventors: Anitha Kannan, Cupertino, CA (US); Simon John Baker, Los Altos Hills, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 183 days.

(21) Appl. No.: 14/339,242

(22) Filed: Jul. 23, 2014

(65) Prior Publication Data

US 2016/0026872 A1 Jan. 28, 2016

(51) Int. Cl.
*G06F 17/00* (2006.01)
*G06K 9/00* (2006.01)
*G06F 17/30* (2006.01)
*G06K 9/62* (2006.01)
*G06K 9/66* (2006.01)
*G09B 5/02* (2006.01)
*G06T 7/246* (2017.01)

(52) U.S. Cl.
CPC ..... *G06K 9/00718* (2013.01); *G06F 17/3082* (2013.01); *G06F 17/30793* (2013.01); *G06F 17/30799* (2013.01); *G06F 17/30828* (2013.01); *G06K 9/6267* (2013.01); *G06K 9/66* (2013.01); *G06T 7/246* (2017.01); *G09B 5/02* (2013.01); *G06T 2207/10016* (2013.01); *G06T 2207/20081* (2013.01)

(58) Field of Classification Search
CPC ........ G06F 17/2229; G06F 17/308828; G06F 17/30828
See application file for complete search history.

(56) References Cited

U.S. PATENT DOCUMENTS

| 5,414,809 | A | * | 5/1995 | Hogan | G06F 3/0481 345/440 |
|---|---|---|---|---|---|
| 5,640,580 | A | * | 6/1997 | Slayden | G06F 3/0489 715/209 |
| 6,164,975 | A | * | 12/2000 | Weingarden | G09B 7/04 434/118 |
| 6,774,917 | B1 | * | 8/2004 | Foote | G06F 17/30814 707/E17.028 |
| 7,110,989 | B2 | * | 9/2006 | Iemoto | G09B 5/02 706/12 |
| 7,542,971 | B2 | * | 6/2009 | Thione | G06F 17/24 |

(Continued)

OTHER PUBLICATIONS

"International Search Report & Written Opinion Issued in PCT Application No. PCT/US2015/041051", Mailed Date Dec. 22, 2015, 20 Pages.

(Continued)

*Primary Examiner* — Laurie Ries
(74) *Attorney, Agent, or Firm* — Lyon & Harr, LLP; Richard T. Lyon

(57) ABSTRACT

The presentation style of a video is identified. A set of features that represents the video is computed. A pre-learned video presentation style classifier is then used to weight each of the features in the set of features and determine a presentation style that is predominately employed in the video based on the weighting of the features.

15 Claims, 17 Drawing Sheets

(56) References Cited

U.S. PATENT DOCUMENTS

| | | | | |
|---|---|---|---|---|
| 7,631,260 | B1* | 12/2009 | Riggs | G06F 17/3089 |
| | | | | 715/716 |
| 7,689,008 | B2* | 3/2010 | Hammoud | G06K 9/00604 |
| | | | | 382/103 |
| 8,356,997 | B1* | 1/2013 | Bergeron | G09B 7/04 |
| | | | | 434/323 |
| 8,737,817 | B1 | 5/2014 | Izo et al. | |
| 8,794,979 | B2* | 8/2014 | Beavers | G09B 5/14 |
| | | | | 434/322 |
| 9,271,035 | B2* | 2/2016 | Mei | G06Q 30/0276 |
| 2001/0031456 | A1* | 10/2001 | Cynaumon | G09B 7/02 |
| | | | | 434/350 |
| 2001/0055749 | A1* | 12/2001 | Siefert | G06F 17/22 |
| | | | | 434/322 |
| 2003/0217328 | A1* | 11/2003 | Agassi | G06F 17/30699 |
| | | | | 715/202 |
| 2007/0038931 | A1* | 2/2007 | Allaire | G06Q 30/0239 |
| | | | | 715/206 |
| 2007/0055695 | A1 | 3/2007 | Dorai et al. | |
| 2008/0019669 | A1 | 1/2008 | Girshick et al. | |
| 2008/0166045 | A1* | 7/2008 | Xu | G06K 9/00771 |
| | | | | 382/170 |
| 2009/0196464 | A1* | 8/2009 | Dimitrova | G06K 9/00295 |
| | | | | 382/118 |
| 2009/0208106 | A1* | 8/2009 | Dunlop | G06K 9/00664 |
| | | | | 382/173 |
| 2009/0265389 | A1* | 10/2009 | Kalpaxis | G06K 9/4652 |
| 2009/0327168 | A1* | 12/2009 | Weinberger | H04L 12/585 |
| | | | | 706/11 |
| 2010/0169292 | A1* | 7/2010 | Radhakrishnan | G06F 17/30781 |
| | | | | 707/706 |
| 2011/0026825 | A1* | 2/2011 | Chaudhuri | G06K 9/00751 |
| | | | | 382/170 |
| 2011/0081075 | A1* | 4/2011 | Adcock | G06K 9/00751 |
| | | | | 382/165 |
| 2011/0096228 | A1* | 4/2011 | Deigmoeller | G06K 9/00624 |
| | | | | 348/441 |
| 2012/0156667 | A1* | 6/2012 | Singer | G09B 5/00 |
| | | | | 434/350 |
| 2013/0067319 | A1* | 3/2013 | Olszewski | G06F 17/218 |
| | | | | 715/234 |
| 2013/0251340 | A1* | 9/2013 | Jiang | G06K 9/00718 |
| | | | | 386/244 |
| 2013/0308921 | A1* | 11/2013 | Budzinski | H04N 9/8205 |
| | | | | 386/241 |
| 2014/0099624 | A1* | 4/2014 | Dohring | G09B 7/00 |
| | | | | 434/350 |
| 2014/0220542 | A1* | 8/2014 | Wolf | G09B 7/02 |
| | | | | 434/362 |
| 2015/0169747 | A1* | 6/2015 | Hume | G06F 17/30752 |
| | | | | 704/8 |

OTHER PUBLICATIONS

Agrawal, et al., "Enriching Textbooks with Images", Proceedings of the 20th Association for Computing Machinery (ACM) international conference on Information and knowledge management (CIKM'11), Oct. 24-28, 2011, pp. 10.

Agrawal, et al., "Mining Videos from the Web for Electronic Textbooks", Microsoft Research Technical Report No. MSR-TR-2014-5, Jan. 2014, pp. 11, Microsoft Research.

Baker, et al., "A Database and Evaluation Methodology for Optical Flow", International Journal of Computer Vision, Mar. 2011, pp. 1-31, vol. 92, Issue 1, Springer US.

Bergen, et al., "Hierarchical Model-Based Motion Estimation", Proceedings of the Second European Conference on Computer Vision (ECCV '92), May 19, 1992, pp. 237-252, Springer-Verlag.

Criminisi, et al., "Decision Forests: A Unified Framework for Classification, Regression, Density Estimation, Manifold Learning and Semi-Supervised Learning", Foundations and Trends in Computer Graphics and Vision, Feb. 2012, pp. 150, vol. 7, Issue 2-3, NOW Publishers Inc..

Fergus, et al., "Removing Camera Shake from a Single Photograph", Association for Computing Machinery (ACM) Transactions on Graphics (TOG)—Proceedings of ACM Special Interest Group on Computer Graphics and Interactive Techniques (SIGGRAPH) 2006 TOG, Jul. 2006, pp. 787-794, vol. 25, Issue 3, ACM.

Field, "What is the Goal of Sensory Coding", Neural Computation, Jul. 1994, pp. 559-601, vol. 6, Issue 4, MIT Press.

Horn, et al., "Determining Optical Flow", Artificial Intelligence, Aug. 1981, pp. 185-203, vol. 17, North Holland.

Hua, et al., "What Can Visual Content Analysis Do for Text Based Image Search?", 2009 Institute of Electrical and Electronics Engineers (IEEE) International Conference on Multimedia and Expo (ICME 2009), Jun. 28-Jul. 3, 2009, pp. 1480-1483, IEEE.

Kokkodis, et al., "Assigning Videos to Textbooks at Appropriate Granularity", Proceedings of the first Association for Computing Machinery (ACM) conference on Learning @ Scale (L@S'14), Mar. 4-5, 2014, pp. 2, ACM.

Kowdle, et al., "Video Categorization Using Object of Interest Detection", 2010 17th Institute of Electrical and Electronics Engineers (IEEE) International Conference on Image Processing (ICIP'10), Sep. 26-29, 2010, pp. 4, IEEE.

Khribi, et al., "Toward a fully automatic learner modeling based on web usage mining with respect to educational preferences and learning styles", Proceedings of the 2013 Institute of Electrical and Electronics Engineers (IEEE) 13th International Conference on Advanced Learning Technologies, Jul. 15-18, 2013, pp. 403-407, IEEE Computer Society.

Mariooryad, et al., "Automatic Characterization of Speaking Styles in Educational Videos", International Conference on Acoustics, Speech, and Signal Processing (ICASSP), May 2014, pp. 5, ICASSP.

Meeker, et al., "Internet Trends", D11 Conference, May 29, 2013, pp. 117, Kleiner Perkins Caufield Byers (KPCB).

Miller, "Integrating Online Multimedia into College Course and Classroon: With Application to the Social Sciences", Multimedia Educational Resource for Learning and Online Teaching (MERLOT) Journal of Online Learning and Teaching, Jun. 2009, pp. 395-423, vol. 5, Issue 2, MERLOT.

Ramachandran, et al., "VideoMule: A Consensus Learning Approach to Multi-Label Classification from Noisy User-Generated Videos", Proceedings of the 17th Association for Computing Machinery (ACM) international conference on Multimedia (MM'09), Oct. 19-24, 2009, pp. 4, ACM.

Schindler, et al., "Internet Video Category Recognition", Proceedings of the 2008 Institute of Electrical and, Electronics Engineers (IEEE) Computer Society Conference on Computer Vision and Pattern Recognition Workshops (CVPRW '08), Jun. 23-28, 2008, pp. 8, IEEE.

Song, et al., "Taxonomic Classification forWeb-based Videos", 2010 Institute of Electrical and Electronics Engineers (IEEE) Conference on Computer Vision and Pattern Recognition (CVPR'10), Jun. 13-18, 2010, pp. 871-878, IEEE.

Shuib, et al., "LSIST: Learning Style Based Information Seeking Tool", Research Notes in Information Science (RNIS), May 2013, pp. 40-45, vol. 13, The International Association for Information, Culture, Human and Industry Technology (AICIT).

Viola, et al., "Rapid Object Detection using a Boosted Cascade of Simple Features", Proceedings of the 2001 Institute of Electrical and Electronics Engineers (IEEE) Computer Society Conference on Computer Vision and Pattern Recognition (CVPR 2001), Dec. 8-14, 2001, pp. I-511 -I-518, vol. 1, IEEE.

Wang, et al., "YouTubeCat: Learning to Categorize Wild Web Videos", 2010 Institute of Electrical and Electronics Engineers (IEEE) Conference on Computer Vision and Pattern Recognition (CVPR), Jun. 13-18, 2010, pp. 8, IEEE.

Wolpert, "Stacked Generalization", Neural Networks, Feb. 5, 1992, pp. 57, vol. 5, Issue 2, Elsevier Science Ltd.

Zanetti, et al., "A walk through the web's video clips", 2008 Institute of Electrical and Electronics Engineers (IEEE) Computer Society Conference on Computer Vision and Pattern Recognition Workshops (CVPRW '08), Jun. 23-28, 2008, pp. 8, IEEE.

(56) References Cited

OTHER PUBLICATIONS

Zhang, et al., "Multiple-Instance Pruning for Learning Efficient Cascade Detectors", Advances in Neural Information Processing Systems 20 (NIPS 2007), Dec. 3, 2007, pp. 1-8, Neural Information Processing Systems Foundation, Inc.
"Second Written Opinion Issued in PCT Application No. PCT/US2015/041051", Mailed Date: Aug. 11, 2016, 9 pages.
"International Preliminary Report on Patentability Issued in PCT Application No. PCT/US2015/041051", Mailed Date: Nov. 17, 2016, 11 Pages.

* cited by examiner

| Different Presentation Styles Employed In Educational Videos ||
| Presentation Style | Presentation Style Classification |
| --- | --- |
| Rendered Slide Show | Rendered Video |
| Rendered Slide Show That Includes A Video Of The Presenter | Rendered Video |
| Rendered Animation | Rendered Video |
| Rendered Photographs | Rendered Video |
| Rendered Hand-Drawn Slides | Rendered Video |
| Natural Video | Real-World Video |
| Video Of An Interview | Real-World Video |
| Video Of Handwriting On Paper | Real-World Video |
| Video Of Projected Slides | Real-World Video |
| Video Of A Whiteboard | Real-World Video |
| Video Of A Blackboard | Real-World Video |

FIG. 1

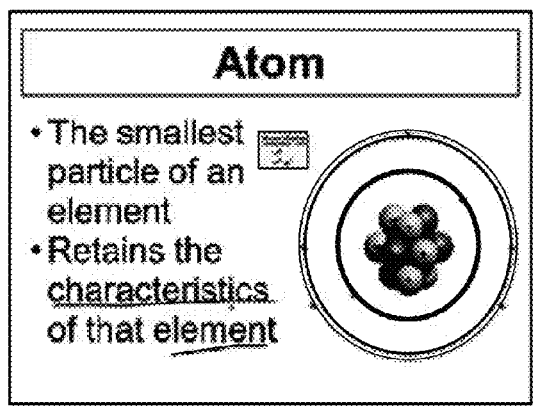

FIG. 3

FIG. 7

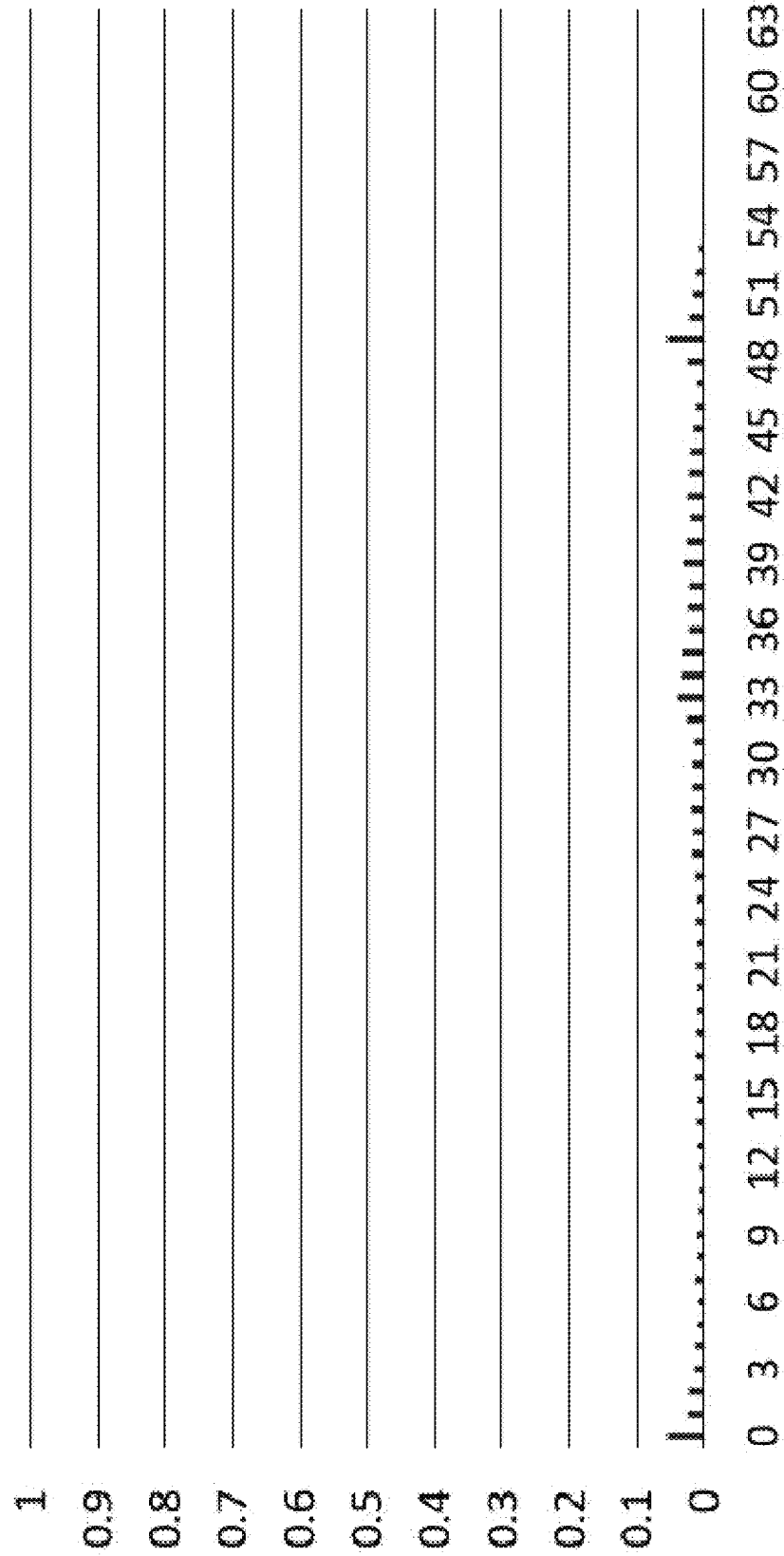

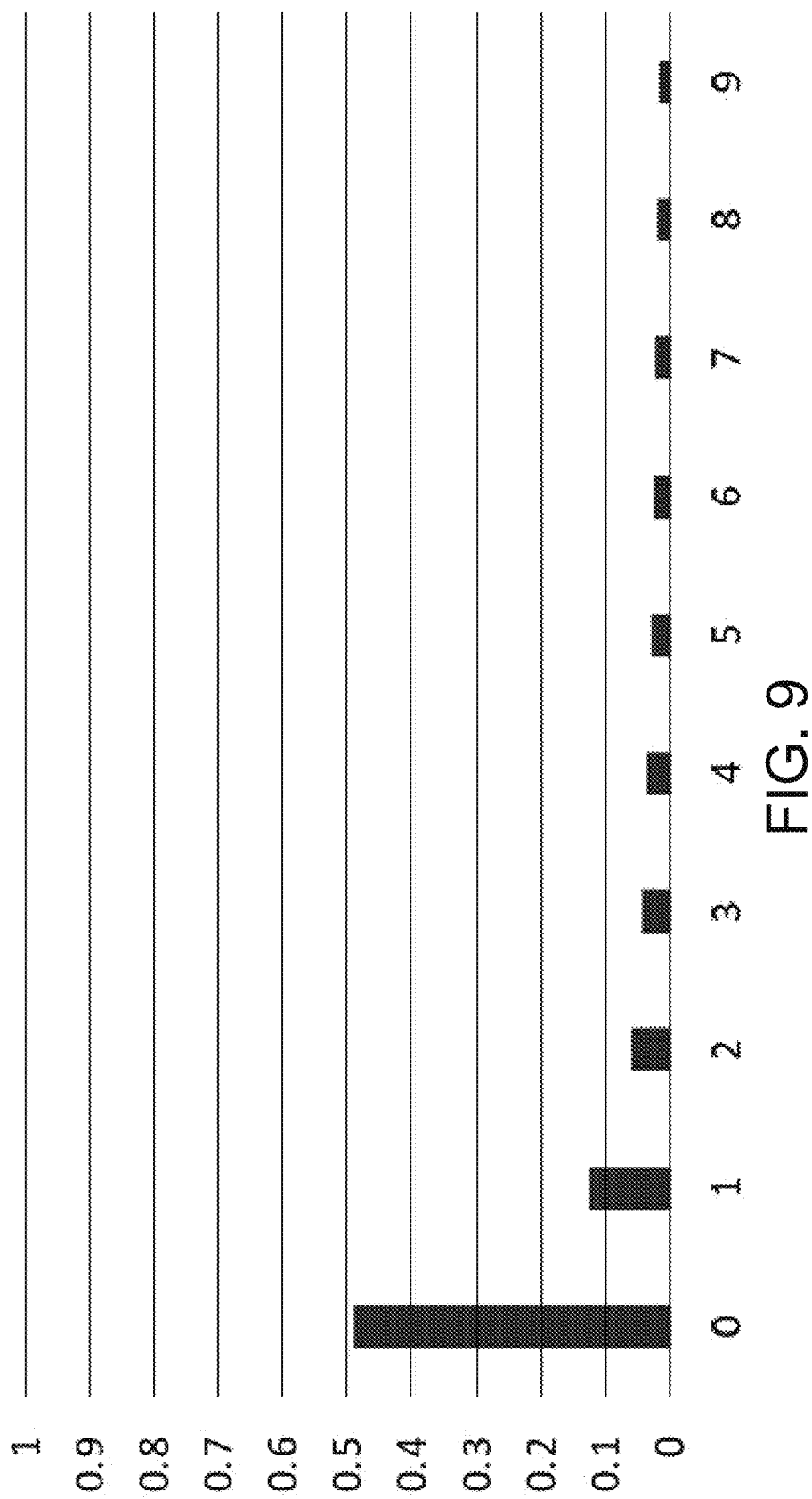

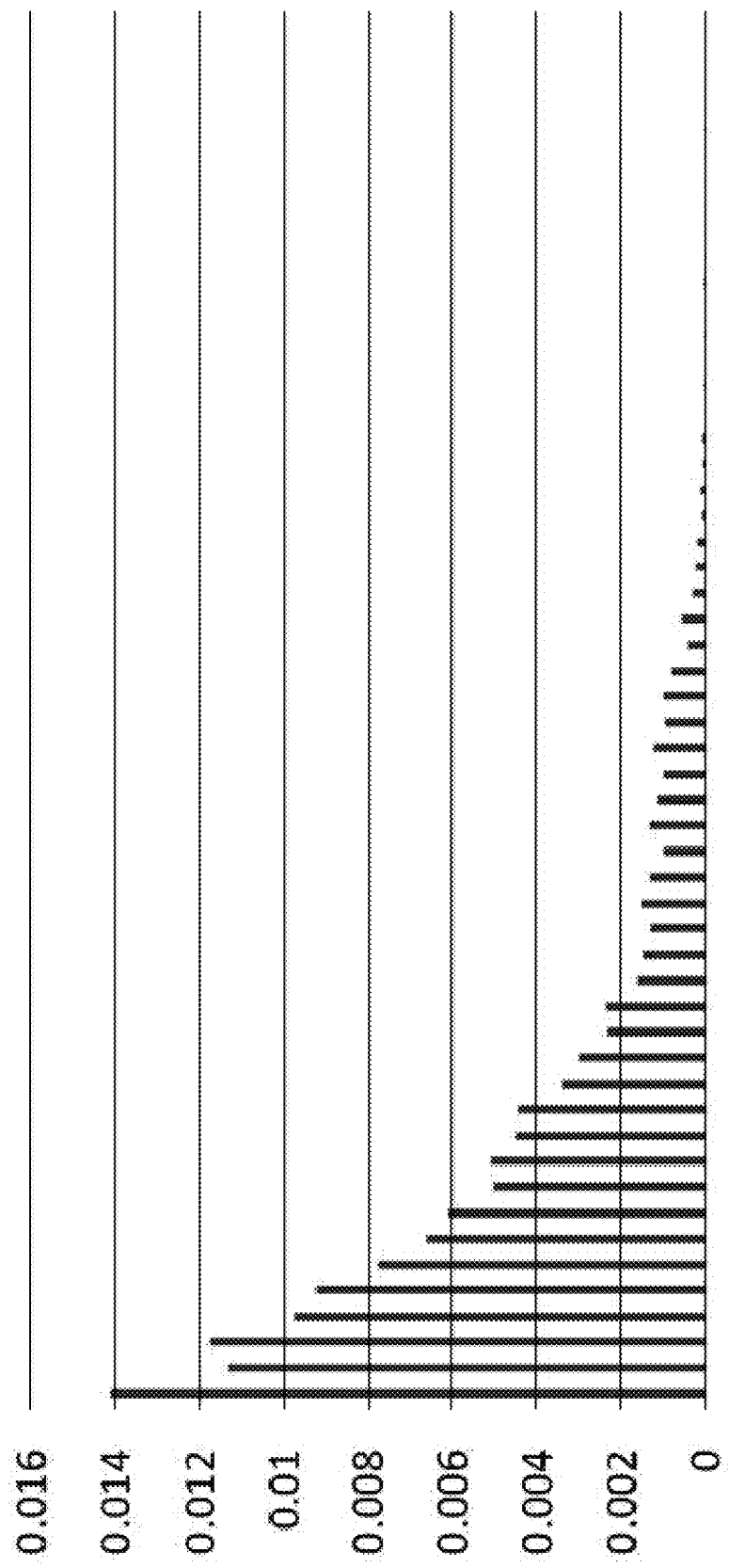

1: Input: $L = \{x^1, y^1, ..., x^n, y^n\}$
2: Output: Presentation Style Classifier $H$ learned from $L$
3: Divide $L$ into $B$ and $S$
4: /* Learn a 3-way classifier for each possible pair of styles */
5: /* in $C = \{c_1, ..., c_{11}\}$ */
6: $H_{pool} = \emptyset$
7: for all $(c_1, c_2) \in \text{ALLPAIRS}(C)$ do
8:    $F = \{(x, y) \in S \mid y = c_1 \text{ or } y = c_2\}$
9:    for all $(x, y) \in S - F$ do
10:      $F = F \cup \{(x, \bot)\}$
11:    end for
12:    $H_{c_1 c_2} = \text{LEARNEDCLASSIFIER}(\{(x_l, y) \mid (x, y) \in F\})$
13:    $H_{pool} = H_{pool} \cup H_{c_1 c_2}$
14: end for
15: /* Use all 3-way classifiers to embed all X in a */
16: /* space of style membership probabilities */
17: Define $L'_S = \emptyset$
18: for all $(x, y) \in S$ do
19:    $z' = \emptyset$
20:    for all $h \in H_{pool}$ do
21:      $z^h = \text{GETPREDICTIONPROBABILITIES}(h, x)$
22:      $z' = z' \cup z^h$
23:    end for
24:    $L'_S = L'_S \cup \{(z', y)\}$
25: end for
26: $H = \text{LEARNEDPRESENTATIONSTYLECLASSIFIER}(L'_S)$

FIG. 16

IDENTIFYING PRESENTATION STYLES OF EDUCATIONAL VIDEOS

BACKGROUND

There are a massive number of videos currently available on the World Wide Web and this number is growing rapidly. For instance, it is estimated that over six billion hours of video are watched each month on the YouTube™ (a trademark of Google Inc.) website, and 100 hours of video are uploaded to the YouTube website every minute. The videos on the World Wide Web include an almost limitless variety of content spanning a broad range of topics and categories. For instance, the videos on the World Wide Web can be categorized into a variety of broad categories such as humorous videos, news videos, videos about specific people or places, videos about society, and educational videos, to name a few. As is appreciated in the art of education, the use of educational videos can increase content retention and concept understanding, especially when the videos are paired with traditional learning materials such as textbooks and the like. Online (e.g., web-based) education is a new and rapidly evolving segment of the education market.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Presentation style identification technique implementations described herein generally involve identifying the presentation style of a video. In one exemplary implementation the video is received and a set of features that represents the video is computed. A pre-learned video presentation style classifier is then used to weight each of the features in the set of features and determine a presentation style that is predominately employed in the video, where this presentation style determination is based on the weighting of the features in the set of features.

DESCRIPTION OF THE DRAWINGS

The specific features, aspects, and advantages of the presentation style identification technique implementations described herein will become better understood with regard to the following description, appended claims, and accompanying drawings where:

FIG. 1 is a table illustrating an exemplary collection of the different presentation styles that can be employed in educational videos, and a classification of these presentation styles.

FIG. 3 illustrates a grayscale version of an exemplary frame of a rendered slide show video.

FIG. 7 illustrates a grayscale version of an exemplary frame of a natural video.

FIG. 8 is a bar graph illustrating a histogram of pixel intensities for the video frame shown in FIG. 7.

FIG. 9 is a bar graph illustrating a histogram of small gradient magnitudes for the video frame shown in FIG. 7.

FIG. 10 is a bar graph illustrating a histogram of large gradient magnitudes for the video frame shown in FIG. 7.

FIG. 16 is a code listing illustrating an exemplary implementation, in simplified form, of pseudo-code for learning the video presentation style classifier.

DETAILED DESCRIPTION

Figure 2:
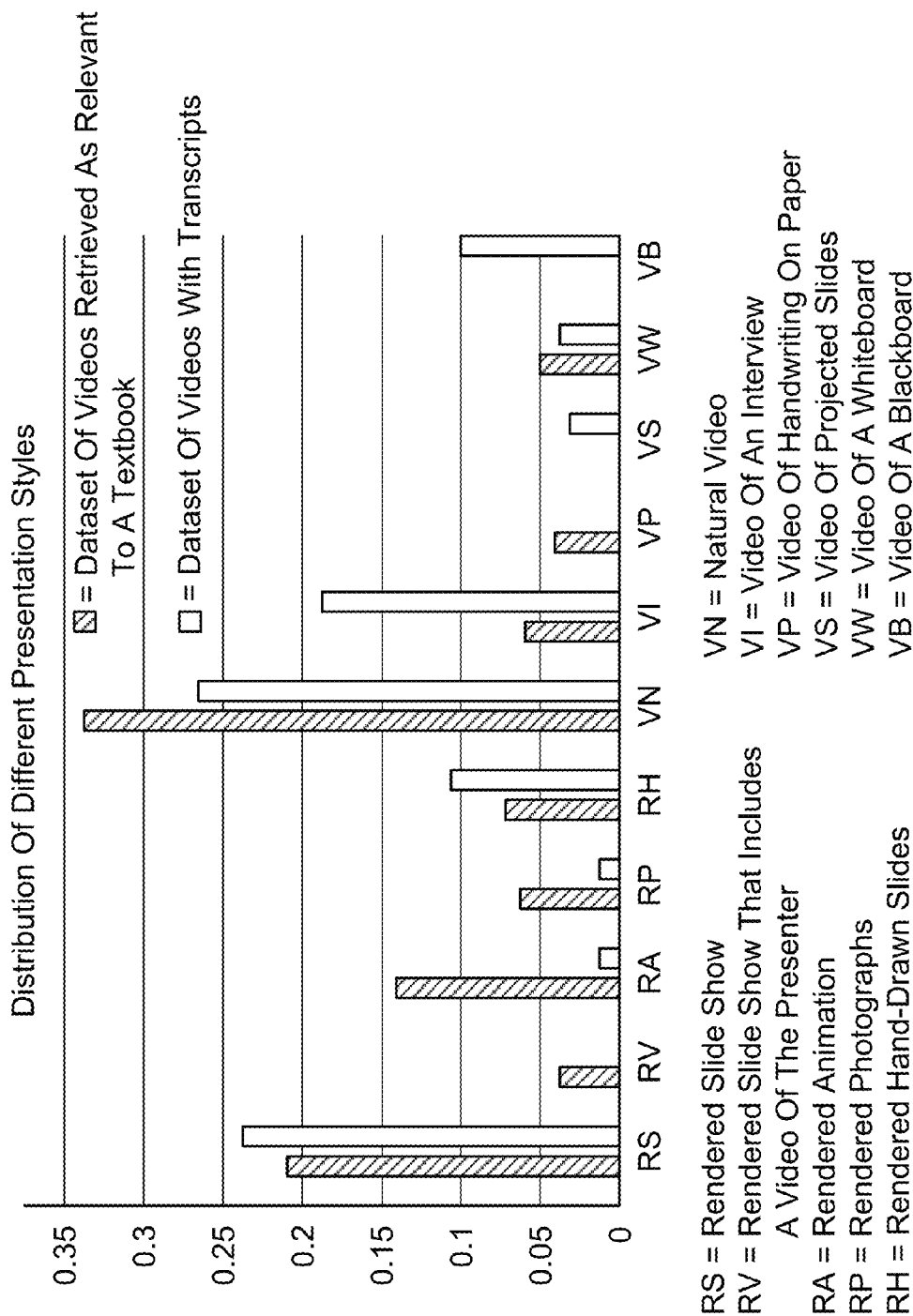
FIG. 2 is a bar graph illustrating the distribution of the different presentation styles employed within a dataset of videos that are retrieved as relevant to a textbook, and another dataset of videos with transcripts that were curated for the presentation style identification technique implementations described herein.

In the following description of presentation style identification technique implementations reference is made to the accompanying drawings which form a part hereof, and in which are shown, by way of illustration, specific implementations in which the presentation style identification technique can be practiced. It is understood that other implementations can be utilized and structural changes can be made without departing from the scope of the presentation style identification technique implementations.

It is also noted that for the sake of clarity specific terminology will be resorted to in describing the presentation style identification technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation" means that a particular feature, a particular structure, or particular characteristics described in connection with the implementation can be included in at least one implementation of the presentation style identification technique. The appearances of the phrases "in one implementation", "in another implementation", "in an exemplary implementation", "in an alternate implementation" in various places in the specification are not necessarily all referring to the same implementation, nor are separate or alternative implementations mutually exclusive of other implementations. Yet furthermore, the order of process flow representing one or more implementations of the presentation style identification technique does not inherently indicate any particular order not imply any limitations of the presentation style identification technique.

1.0 Educational Videos on the Web

The term "educational video" is used herein to refer to any type of video having content that presents at least one concept in a manner that teaches the concept to users who watch the video. The concept(s) in an educational video is generally associated with a given topic or subject area. A given educational video generally includes one or more different presentation styles, examples of which will be described in more detail hereafter.

As described heretofore, there are a massive number of videos currently available on the World Wide Web (herein sometimes simply referred to as the web) and these videos include educational videos. The number of educational videos that are available on the web is growing rapidly. For example, the YouTube Education website (also known as YouTube EDU) alone currently includes over 700,000 high quality educational videos from over 800 different channels such as the Khan Academy$^{SM}$ (a service mark of Khan Academy Inc.), among others. The educational videos on the web span a broad range of topics and grade levels. For example, the educational videos on the YouTube Education website cover a broad range of subject areas at the primary education level (e.g., grades 1-5), the secondary education level (e.g., grades 6-12), the university level, and the lifelong learning level. Additionally, Massive Open Online Courses (MOOCs) are a recent development in online education that is quickly gaining in popularity. MOOCs offer educational videos from a variety of online education providers such as Coursera™ (a trademark of Coursera Inc.), EdX$^{SM}$ (a service mark of edX Inc.), and Udacity$^{SM}$ (a service mark of Udacity Inc.), among others. MOOC educational videos also span a broad range of topics and grade levels.

The massive number of educational videos that are available on the web and the rapid growth thereof has resulted in a significant amount of educational video content redundancy on the web. For instance, a simple analysis performed on the YouTube website shows that there are over 30 different videos available on this website that have nearly identical content on the topic of "the law of conservation of mass". This content redundancy introduces variations in the aesthetics of the educational videos that are available on the web. Examples of such aesthetic variations include, but are not limited to, variations in the quality of the videos, variations in the nature of the presenter that appears in the videos (e.g., are they "lively" as opposed to being dull/boring), and variations in the presentation style that is employed in the videos (e.g., does a given video include a presenter who is lecturing about "the law of conservation of mass" in front of a whiteboard, or does the video include a rendered slide show describing this law, or does the video include a recording of a demonstration of this law, or does the video include a rendered animation of this law).

2.0 Identifying Presentation Styles of Educational Videos

The presentation style identification technique implementations described herein are generally applicable to learning a video presentation style classifier, and to identifying the presentation style of a given video. Although it is assumed herein that this video is an educational video, it is noted that the presentation style identification technique implementations can also be used to identify the presentation style of any other category of videos.

As will be appreciated from the more detailed description that follows, the presentation style identification technique implementations described herein leverage the aforementioned educational video content redundancy that exists on the web, and allow a given user to search for and retrieve relevant educational videos that match (e.g., are attuned to) the user's preferences. In other words, the presentation style identification technique implementations are able to account for user preferences during video search activities while maintaining relevancy. It will be appreciated that there are many facets to user preferences in the context of educational videos including the quality of the videos, the nature of the presenter that appears in the videos, and the presentation style that is employed in the videos, among others. The presentation style identification technique implementations allow a user who is looking for an educational video on a specific topic to search the web for relevant videos on this topic that match any preferences the user may have with regard to these facets. The presentation style identification technique implementations also have a number of different applications in the new and rapidly evolving online education market, and in the video search engine and video portal markets. The presentation style identification technique implementations can also be used in a variety of recommendation system applications. For example, in the case where a user is using an e-reader device to read a particular electronic book, the presentation style identification technique implementations can be used to automatically recommend videos to the user that are not only relevant to the book they are reading, but are also based on the presentation styles of the videos that the user has previously chosen to view. In other words, a recommendation system can learn the presentation style preferences of the user by using the presentation style identification technique implementations to learn the presentation style of each video that the user views. The e-reader device can then communicate with the recommendation system to determine the user's presentation style preferences.

2.1 Different Presentation Styles Employed in Educational Videos

It will be appreciated that the educational videos on the web can employ a variety of different presentation styles. This section describes an exemplary taxonomy of the different presentation styles that can be employed in such videos.

In an exemplary implementation of the presentation style identification technique described herein a large number (e.g., thousands) of educational videos were manually examined by a group of individuals (hereafter referred to as judges) in order to identify the particular presentation style that is predominately employed in each of the videos (in other words, the judges identified the "dominant" presentation style employed in each of the videos). This examination identified 11 different presentation styles which are illustrated in FIG. 1, where each of these 11 different presentation styles corresponds to a different semantically meaningful group of educational videos. As exemplified in FIG. 1, in an exemplary implementation of the presentation style identification technique the 11 different presentation styles are categorized into two classes, namely, rendered videos and real-world videos. The term "rendered video" is used herein to refer to a video that is generated directly by a computing device (herein also referred to as a computer). The term "real-world video" is used herein to refer to a video that is captured using any type of video camera.

Referring again to FIG. 1, in an exemplary implementation of the presentation style identification technique described herein the rendered video class of presentation styles that can be employed in educational video includes five different presentation styles, namely a rendered slide show, a rendered slide show that includes a video of the presenter (e.g., the speaker), a rendered animation, rendered photographs, and rendered hand-drawn slides. An educational video that employs the rendered slide show presentation style is a rendered video which includes a sequence of slides that were generated using a conventional presentation graphics program (e.g., PowerPoint® (a registered trademark of Microsoft Corporation), among other presentation graphics programs) running on a computing device. An educational video that employs the rendered slide show that includes a video of the presenter presentation style is a rendered video which includes the just-described computer-generated sequence of slides, where a real-world video of the presenter of the slides has been overlaid on top of the slides in a prescribed region thereof. An educational video that employs the rendered animation presentation style is a rendered video which includes any type of computer-generated animation. An educational video that employs the rendered photographs presentation style is a rendered video which includes a sequence of photographs, where one or more of the photographs may include one or more enhancements such as overlaid text, or a conventional Ken Burns effect (which is a panning and zooming effect that is often used in the art of video production). An educational video that employs the rendered hand-drawn slides presentation style is a rendered video which includes a sequence of slides that were hand-drawn using a conventional drawing program running on a computing device (e.g., Adobe Illustrator™ (a trademark of Adobe Systems Inc.), among other drawing programs) rather than using a pen and paper (or the like).

Referring again to FIG. 1, in an exemplary implementation of the presentation style identification technique described herein the real-world video class of presentation styles that can be employed in educational video includes six different presentation styles, namely a natural video, a video of an interview, a video of handwriting on paper, a video of projected slides, a video of a whiteboard, and a video of a blackboard. An educational video that employs the natural video presentation style is a real-world video which includes a video recording of either a particular real-world phenomenon, or a scene, or a demonstration, or a experiment, or the like. An educational video that employs the video of an interview presentation style is a real-world video which includes a video recording of a person who is talking about a particular subject or explaining a particular concept. An educational video that employs the video of handwriting on paper presentation style is a real-world video which includes a video recording of a person who is writing on a piece of paper or the like with a pen. An educational video that employs the video of projected slides presentation style is a real-world video which includes a video recording of a sequence of slides which are optically projected onto either a screen, or a wall, or the like, where the projected slides either were generated using a conventional presentation graphics program running on a computing device, or were hand-drawn using a conventional drawing program running on a computing device. An educational video that employs the video of a whiteboard presentation style is a real-world video which includes a video recording of a person who is lecturing in front of a whiteboard and is writing thereon. An educational video that employs the video of a blackboard presentation style is a real-world video which includes a video recording of a person who is lecturing in front of a blackboard and is writing thereon.

2.2 Curation of Presentation-Style-Labeled Datasets of Educational Videos

In an exemplary implementation of the presentation style identification technique described herein two different datasets of educational videos were collected from videos on the YouTube website that were specifically tagged into the "education" category. One of these datasets is a dataset of videos that are retrieved as relevant to a textbook, and the other of these datasets is a dataset of videos with transcripts. A ground-truth label specifying one of the aforementioned 11 different presentation styles was manually generated for each of the educational videos in both of these datasets. The ground-truth label for a given educational video in a given dataset was generated by a judge who manually examined the video in order to identify which one of the 11 different presentation styles was predominately employed in the video, and then generated a ground-truth label for the video that specifies this one presentation style. It will be appreciated that a given educational video may employ more than one presentation style. By way of example but not limitation, an educational video may be a rendered video that includes a sequence of slides which were generated using a conventional presentation graphics program, where many of these slides include either computer-generated animation or photographs. An educational video may also include temporal segments that employ different presentation styles (e.g., a video may start with a recording of a person who is talking about a particular subject or explaining a particular concept, and then switch to a recording of an experiment). In such cases, the judges who were manually examining the videos in the aforementioned two datasets were instructed to generate a ground-truth label specifying the presentation style that was predominately employed in each of the videos.

FIG. 2 illustrates the distribution of the different presentation styles employed within the dataset of videos that are retrieved as relevant to a textbook, and the dataset of videos with transcripts. As is shown in FIG. 2 these two datasets have different presentation style distributions stemming from the fact that they were collected in different ways.

The dataset of videos that are retrieved as relevant to a textbook includes 589 educational videos that were collected by considering a given textbook and retrieving videos from the YouTube website that were relevant to each section of the textbook using a conventional method for retrieving videos that are relevant to a book such as the COMITY (Coordinated Application Adaptation in Multi-Platform Pervasive Systems) method, among others. The dataset of videos that are retrieved as relevant to a textbook captures the variability in presentation styles when the content of educational videos corresponds to a single theme.

The dataset of videos with transcripts includes 1278 educational videos that were collected by considering all of the videos on the YouTube website that were specifically tagged as "education" and retrieving ones of these videos that were available with a transcript. It will be appreciated that the presence of a transcript for a given video serves as a proxy for ensuring that the video includes truly educational content (e.g., ensuring that the video is truly an educational video). The dataset of videos with transcripts captures the overall distribution of the different presentation styles that exist in educational videos. The ground-truth labels for the videos in the dataset of videos with transcripts were generated in two phases. In the first phase the judges who were manually examining the videos in this dataset were asked to determine if each of the videos was predominately a rendered video or a real-world video. In the second phase, for each of the videos that were determined to be in the rendered video class, the judges were asked to determine which of the aforementioned five different presentation styles in this class were predominately employed in the video; similarly, for each of the videos that were determined to be in the real-world video class, the judges were asked to determine which of the aforementioned six different presentation styles in this class were predominately employed in the video.

2.3 Educational Video Representation

This section describes an exemplary diverse collection of features that are used to represent each of the educational videos in the presentation style identification technique implementations described herein. This collection of features can be categorized into three classes, namely, image features, face features and motion features. Image features are defined herein to be features of a given educational video that are computed for each frame of the video independently. Face features are defined herein to be features of a given educational video that are based on the detection of one or more faces in the video. Motion features are defined herein to be features of a given educational video that are based on how the video changes from frame to frame. In an exemplary implementation of the presentation style identification technique described herein a set of 21 different features is used to represent a given educational video. As will be described in more detail hereafter, these 21 features are made up of six image features, six face features, and nine motion features.

2.3.1 Image Features

Figure 4:
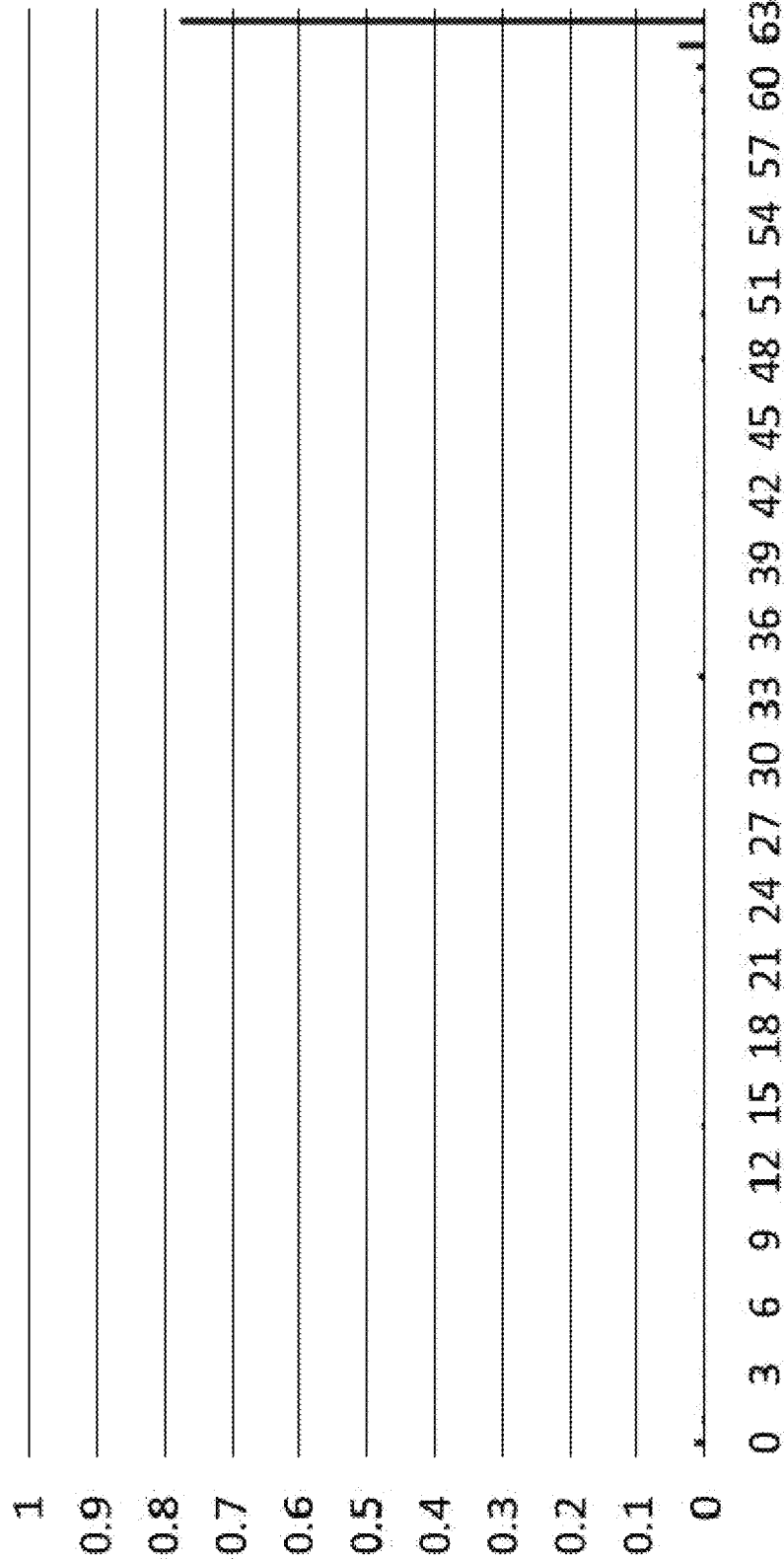
FIG. 4 is a bar graph illustrating a histogram of pixel intensities for the video frame shown in FIG. 3.
Figure 5:
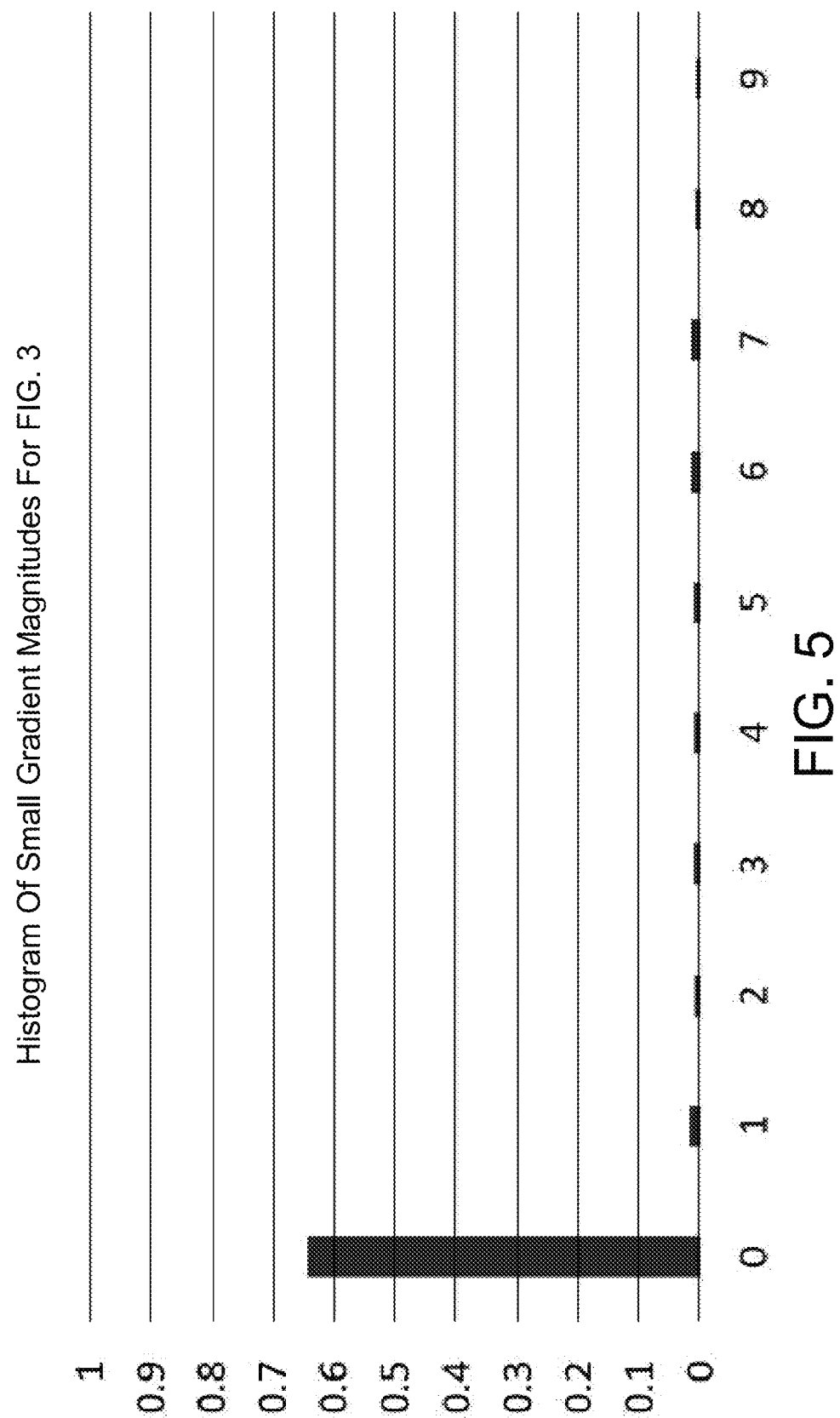
FIG. 5 is a bar graph illustrating a histogram of small gradient magnitudes for the video frame shown in FIG. 3.
Figure 6:
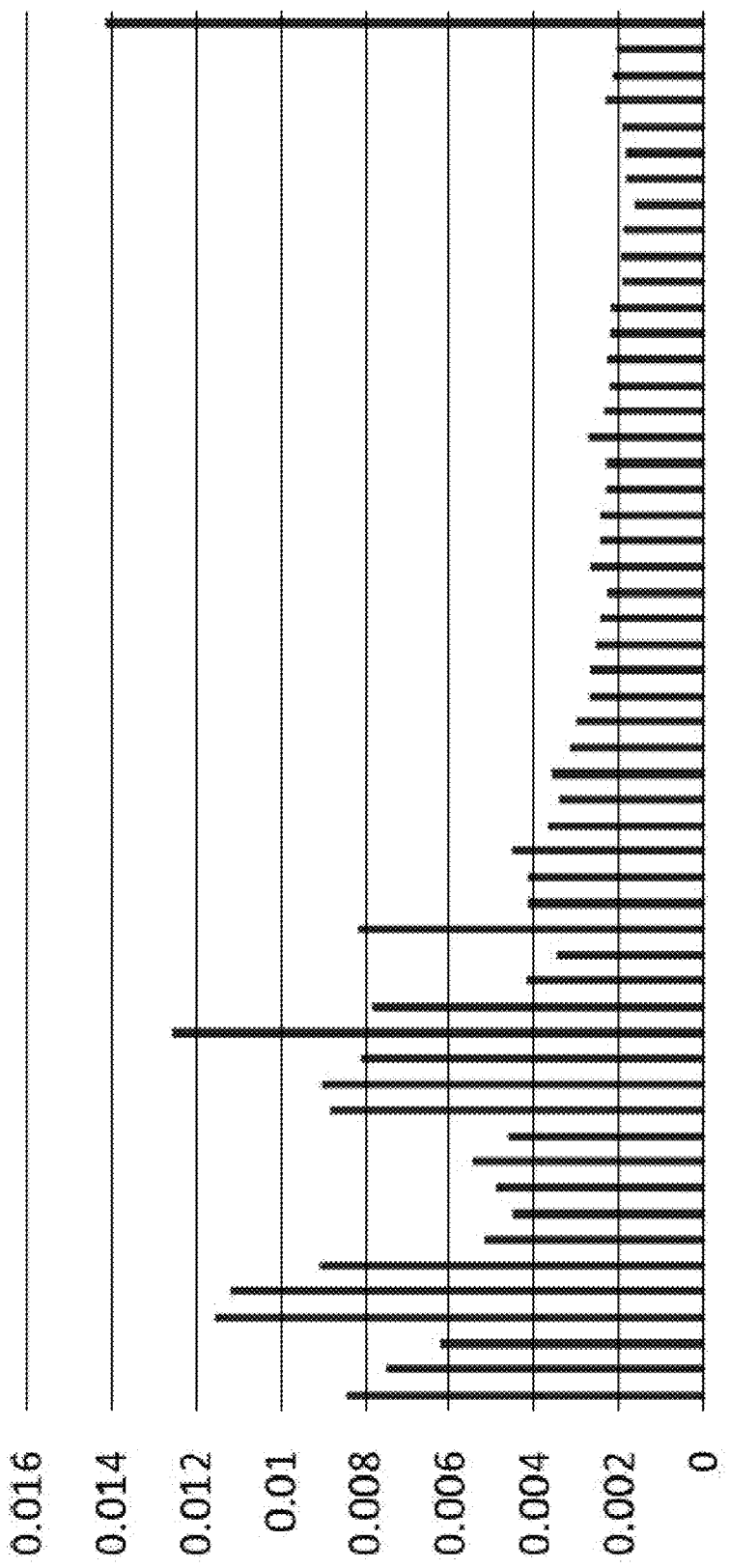
FIG. 6 is a bar graph illustrating a histogram of large gradient magnitudes for the video frame shown in FIG. 3.

The presentation style that is predominately employed in a given educational video is often apparent from a single frame of the video. For instance, a given frame of a rendered slide show video and a given frame of a natural video will generally be very different from each other visually. This fact is exemplified in FIG. 3 which illustrates a grayscale version of an exemplary frame of a rendered slide show video, and FIG. 7 which illustrates a grayscale version of an exemplary frame of a natural video. FIG. 4 illustrates a histogram of pixel intensities for the video frame shown in FIG. 3. FIG. 5 illustrates a histogram of small gradient magnitudes for the video frame shown in FIG. 3. FIG. 6 illustrates a histogram of large gradient magnitudes for the video frame shown in FIG. 3. FIG. 8 illustrates a histogram of pixel intensities for the video frame shown in FIG. 7. FIG. 9 illustrates a histogram of small gradient magnitudes for the video frame shown in FIG. 7. FIG. 10 illustrates a histogram of large gradient magnitudes for the video frame shown in FIG. 7.

The aforementioned six image features that are used by the presentation style identification technique implementations described herein include a low-contrast feature denoted by $feat_{low\text{-}contrast}$, a high-contrast feature denoted by $feat_{high\text{-}contrast}$, a zero-gradients feature denoted by $feat_{0\text{-}grad}$, a low-gradients feature denoted by $feat_{low\text{-}grad}$, a high-gradients feature denoted by $feat_{high\text{-}grad}$ and a noise feature denoted by $feat_{noise}$. These image features are based on the fact that the 11 different presentation styles described herein generally have very different pixel statistics and very different edge statistics, and thus generally have very different pixel intensity and gradient magnitude histograms. These facts are exemplified by comparing the pixel intensity histograms shown in FIGS. 4 and 8, and by comparing the small gradient magnitude histograms shown in FIGS. 5 and 9, and by comparing the large gradient magnitude histograms shown in FIGS. 6 and 10. Exemplary implementations of methods for computing the just-described six image features for a given educational video will now be described in more detail. It is noted that various other methods can also be used to compute these features.

Whenever the educational video is in color, each of the frames f of the video is first converted from color to grayscale. A pixel intensity histogram of each of the frames f of the video is then computed by binning the pixel intensities in the frame f into 64 different pixel intensity bins each of which includes four different possible consecutive gray levels, namely, $bin_0$ [0,3], $bin_1$ [4,7], . . . , $bin_{63}$ [252,255]. The pixel intensity histogram shown in FIG. 4 was computed by binning the pixel intensities of the video frame shown in FIG. 3 into 64 different pixel intensity bins as just described. The pixel intensity histogram shown in FIG. 8 was similarly computed by binning the pixel intensities of the video frame shown in FIG. 7. The video frame shown in FIG. 3 has a dominant pixel intensity bin that corresponds to the white background of this frame as exemplified in FIG. 4, whereas the video frame shown in FIG. 7 has fairly uniform distribution across the pixel intensity bins as exemplified in FIG. 8.

After the pixel intensity histogram of each of the frames f of the educational video has been computed, the following actions are performed for each of the frames f of the video. The 64 different pixel intensity bins for the frame f are sorted by their values, from largest to smallest, in order to provide for invariance to the gray level in the background of the frame f. Given that Low-Contrast(f) denotes the number of sorted pixel intensity bins that are required to fill a prescribed low-contrast threshold $T_{low\text{-}contrast}$ fraction of the pixels in the frame f, Low-Contrast(f) is then computed using the following equation:

$$\text{Low-Contrast}(f) = \min_{l} \left\{ l: \sum_{i=0}^{l} IBinS_i(f) \geq T_{low\text{-}contrast} \right\},$$

where l denotes a prescribed pixel intensity bin number (e.g., $bin_l$) and $IBinS_i(f)$ denotes the value (e.g., the weight) of the $i^{th}$ sorted pixel intensity bin of the frame f.

After Low-Contrast(f) has been computed for each of the frames f of the educational video, the low-contrast feature $feat_{low\text{-}contrast}$ is computed by averaging Low-Contrast(f) across all of the frames of the video as follows:

$$feat_{low\text{-}contrast} = \frac{1}{\#frames} \sum_{f=1}^{\#frames} \text{Low-Contrast}(f),$$

where #frames denotes the total number of frames in the video. $feat_{low\text{-}contrast}$ thus measures pixel intensity statistics for the video according to the low-contrast threshold $T_{low\text{-}contrast}$.

Similarly, given that High-Contrast(f) denotes the number of sorted pixel intensity bins that are required to fill a prescribed high-contrast threshold $T_{high\text{-}contrast}$ fraction of the pixels in a given frame f of the educational video, High-Contrast(f) is then computed for each of the frames f of the video using the following equation:

$$\text{High-Contrast}(f) = \min_l \left\{ l : \sum_{i=0}^{l} IBinS_i(f) \geq T_{high-contrast} \right\}.$$

After High-Contrast(f) has been computed for each of the frames f of the video, the high-contrast feature $feat_{high\text{-}contrast}$ is computed by averaging High-Contrast(f) across all of the frames of the video as follows:

$$feat_{high\text{-}contrast} = \frac{1}{\#frames} \sum_{f=1}^{\#frames} \text{High-Contrast}(f).$$

$feat_{high\text{-}contrast}$ thus measures pixel intensity statistics for the video according to the high-contrast threshold $T_{high\text{-}contrast}$.

The combination of FIGS. 5 and 6 illustrates a histogram of the gradient magnitude for the video frame shown in FIG. 3. This histogram is split into a small gradient magnitudes component (FIG. 5) and a large gradient magnitudes component (FIG. 6) in order to allow these two components to be displayed at different scales. More particularly, FIG. 5 shows one part of the histogram corresponding to fairly weak edges in the video frame shown in FIG. 3, and FIG. 6 shows the other part of the histogram corresponding to stronger edges in the this video frame. Similarly, the combination of FIGS. 9 and 10 illustrates a histogram of the gradient magnitude for the video frame shown in FIG. 7. This histogram is split into a small gradient magnitudes component (FIG. 9) and a large gradient magnitudes component (FIG. 10) in order to allow these two components to be displayed at different scales. More particularly, FIG. 9 shows one part of the histogram corresponding to fairly weak edges in the video frame shown in FIG. 7, and FIG. 10 shows the other part of the histogram corresponding to stronger edges in the this video frame. As exemplified in FIG. 5, the video frame of FIG. 3 has a large number of zero gradients in $bin_0$ due to the constant background in this frame. As exemplified in FIGS. 5 and 6, the video frame of FIG. 3 has relatively few weak but non-zero gradients and relatively many very strong gradients due to the text and lines in this frame.

Given that $GBin_i(f)$ denotes the $i^{th}$ gradient magnitude bin for a given frame f of the educational video, the zero-gradients feature $feat_{0\text{-}grad}$ is defined to be the average of the values (e.g., the weights) of the zero gradient magnitude bins $GBin_0$ for all of the frames of the video. $feat_{0\text{-}grad}$ thus measures the amount of zero gradients that exist in the video. The low-gradients feature $feat_{low\text{-}grad}$ is defined to be the average of the values of the first several non-zero gradient magnitude bins (e.g., $GBin_1, \ldots, GBin_n$, where n is a prescribed small number greater than zero) for all of the frames of the video. $feat_{low\text{-}grad}$ thus measures the amount of weak but non-zero gradients (e.g., the weakest edges) that exist in the video. The high-gradients feature $feat_{high\text{-}grad}$ is defined to be the average of the values of the highest numbered gradient magnitude bins (e.g., $GBin_{63}, \ldots, GBin_{63-m}$, where m is also a prescribed small number greater than zero) for all of the frames of the video. $feat_{high\text{-}grad}$ thus measures the amount of strong gradients (e.g., the strongest edges) that exist in the video.

The noise feature $feat_{noise}$ measures the amount of pixel intensity noise that exists in the educational video. In an exemplary implementation of the presentation style identification technique described herein $feat_{noise}$ is computed in the following manner. For each of the frames of the video, a linear model is fitted to the pixel intensities in a prescribed 3 pixel×3 pixel region of the frame, and then the standard deviation of the error of the actual pixel intensities is measured from this linear model. This measured standard deviation for each of the frames of the video is then averaged across all of the frames of the video.

2.3.2 Face Features

The aforementioned six face features that are used by the presentation style identification technique implementations described herein include a face detection feature denoted by $feat_{face}$, a first moving face feature denoted by $feat_{moving\text{-}face1}$, a second moving face feature denoted by $feat_{moving\text{-}face2}$, a face not present feature that measures the length of the longest sequence of frames in the video where no face is detected denoted by $feat_{face*}$, and a face present feature that measures the length of the longest sequence of frames in the video where just one face is detected denoted by $feat_{face\dagger}$. The six face features also include a face size feature denoted by $feat_{face\text{-}size}$ that measures, across the frames in the video where just one face is detected, the average size of this detected face. These face features are based on the fact that some of the 11 different presentation styles described herein prominently feature the face of the presenter, whereas others of these presentation styles do not. Exemplary implementations of methods for computing the just-described six face features for a given educational video will now be described in more detail. It is noted that various other methods can also be used to compute these features.

The face detection feature $feat_{face}$ is computed using the following equation:

$$feat_{face} = \frac{1}{\#frames} \sum_{f=1}^{\#frames} \text{Face}(f),$$

$$\text{where Face}(f) = \begin{cases} 1 & \text{if } f \text{ has 1 face} \\ 0 & \text{otherwise} \end{cases}.$$

$feat_{face}$ thus measures the percentage of frames in the video where just one face is detected. It will be appreciated that Face(f) can be computed using various methods. In an exemplary implementation of the presentation style identification technique described herein Face(f) is computed using a conventional multiple-instance pruning generalization of a conventional rapid object detection using a boosted cascade of simple features method.

In some situations the face detection feature $feat_{face}$ may detect a face in an educational video that is not the face of the presenter. For instance, consider a situation where a rendered slide show video includes one or more slides that include a face that is not the face of the presenter. In order to address such situations the first and second moving face features $feat_{moving\text{-}face1}$ and $feat_{moving\text{-}face2}$ measure, in different ways, whether or not each detected face is moving. More particularly, for each frame f of the video where just one face is detected (e.g., for each frame f for which Face(f)=1), $feat_{moving\text{-}face1}$ and $feat_{moving\text{-}face2}$ are computed as follows. $feat_{moving\text{-}face1}$ is computed by computing a pixelwise difference across each of the pixels in the detected face between this frame f and the immediately preceding frame, then averaging this difference across each of the pixels in the detected face, and then determining whether or not this average is greater than a prescribed threshold. $feat_{moving\text{-}face2}$ is computed by bordering the detected face with a prescribed shape (e.g., a rectangle, among other shapes), and then comparing the position of this shape in this frame f to the position of this shape in the immediately preceding frame in order to determine whether or not this shape is moving (rather than pixels inside this shape).

In other situations a face that exists in an educational video may go undetected by the face detection feature $feat_{face}$ in some of the frames of the video. For instance, consider a situation where the size of the presenter's face is quite small in a rendered slideshow video that includes a video of presenter, the quality of the video of the presenter is poor, and changes in either the presenter's pose or the illumination of the presenter take place during the video of the presenter. The face not present feature $feat_{face*}$ and the face present feature $feat_{face\dagger}$ are intended to address such situations. $feat_{face*}$ is computed using the following equation:

$$feat_{face*} = 1.0 - \frac{1}{\#frames - 1} \max_{l \le k}\{k - l: \text{Face}(f) = 0 \forall f \in [l, k]\},$$

where l denotes a first prescribed frame number and k denotes a second prescribed frame number which is greater than or equal to l. It will be appreciated that so long as a face is detected in every several frames of the video, $feat_{face*}$ will have a value that is close to 1.0 so that $feat_{face}$ will not be penalized much for intermittently failing to detect a face in the video. It will also be appreciated that $feat_{face\dagger}$ provides a sense of how stable the face detection is.

The face size feature $feat_{face\text{-}size}$ is computed as the square root of the average across each of the frames of the educational video in which just one face is detected of the fraction of the frame area that is occupied by the detected face.

2.3.3 Motion Features

The aforementioned nine motion features that are used by the presentation style identification technique implementations described herein can be categorized into three classes, namely, frequency of motion features, amount of motion features, and type of motion features. In an exemplary implementation of the presentation style identification technique the frequency of motion features measure how often motion (e.g., movement) occurs in a given educational video. The amount of motion features measure how much motion takes place in the video. The type of motion features specify the type of motion that takes place in the video.

2.3.3.1 Frequency of Motion Features

Figure 11:
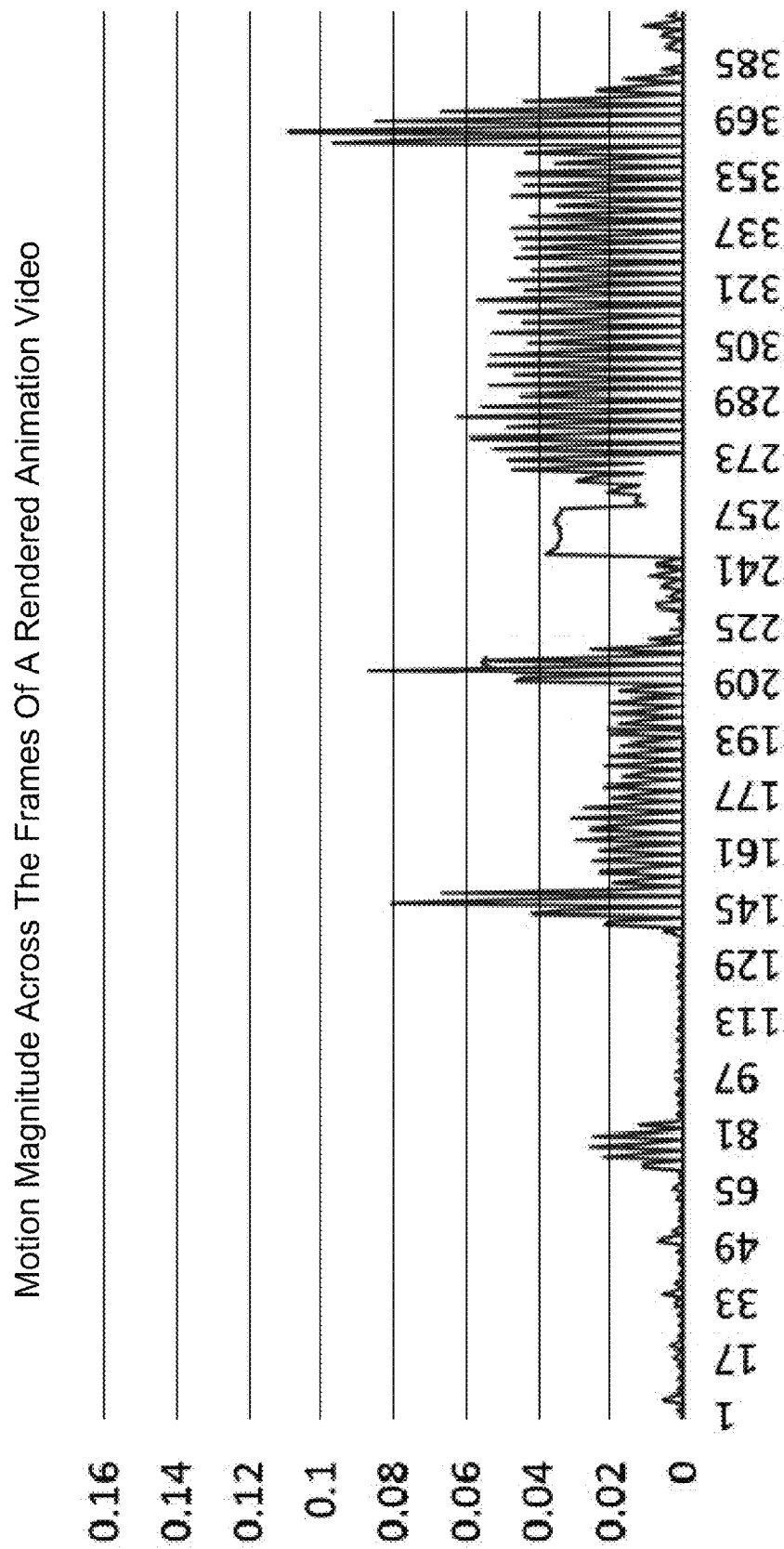
FIG. 11 is a line graph illustrating the motion magnitude across the frames of an exemplary rendered animation video.
Figure 12:
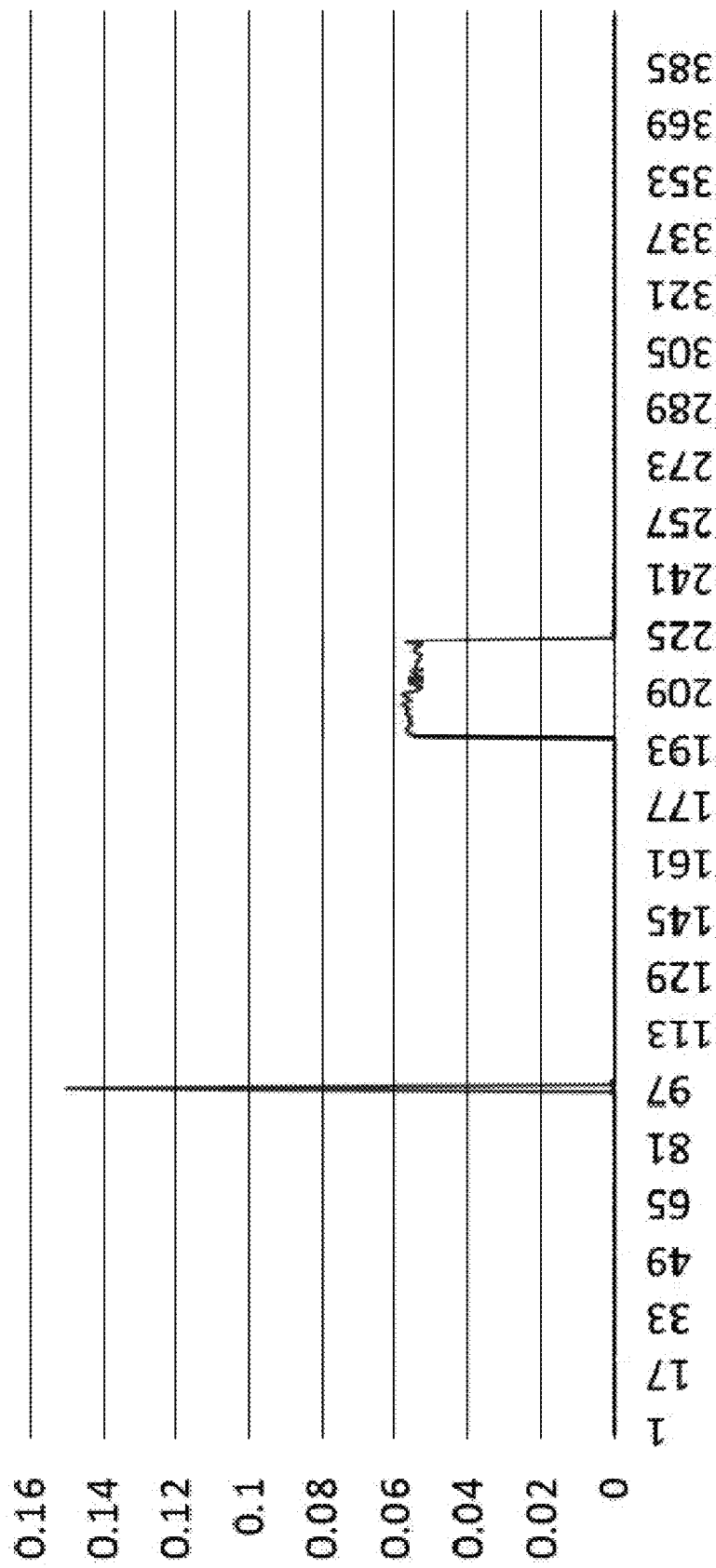
FIG. 12 is a line graph illustrating the motion magnitude across the frames of an exemplary rendered slide show video.

It will be appreciated that the frequency of motion in a given educational video varies considerably across the 11 different presentation styles described herein. In other words, in some types of educational videos the content therein moves (e.g., there is motion across successive frames of the video) a large percentage of the time, whereas in other types of educational videos the content therein moves just once in a while (e.g., a small percentage of the time). For example, the animations in a rendered animation video generally move a significant majority of the time, whereas in a rendered slideshow video there is generally movement/motion just when there is a transition from the current slide to the next slide. These facts are illustrated in FIGS. 11 and 12 respectively. More particularly, FIG. 11 illustrates the motion magnitude across the frames (in other words, the temporal frequency of motion) of an exemplary rendered animation video, and FIG. 12 illustrates the motion magnitude across the frames of an exemplary rendered slide show video.

The frequency of motion features include a first motion frequency feature denoted by $feat_{motf1}$, a second motion frequency feature denoted by $feat_{motf2}$, a motion present feature that measures the length of the longest sequence of frames in the video where there is motion (e.g., the longest sequence of frames where motion is detected between successive frames of the video) denoted by $feat_{motf*}$, and a motion not present feature that measures the length of the longest sequence of frames in the video where there is no motion (e.g., the longest sequence of frames where no motion is detected between successive frames of the video) denoted by $feat_{motf\dagger}$. Exemplary implementations of methods for computing each of these features for an exemplary educational video will now be described in more detail. It is noted that various other methods can also be used to compute these features.

Whenever the educational video is in color, each of the frames f of the video is first converted from color to grayscale. The magnitude of motion MMag(f) in each of the frames f of the video is then computed using the following equation:

$$MMag(f) = \frac{1}{256 \times \#pixels} \sum_{x,y} |I_{x,y}(f) - I_{x,y}(f-1)|,$$

where #pixels denotes the number of pixels in each frame of the video, and $I_{x,y}(f)$ denotes the intensity of the grayscale pixel (x, y) of frame f.

After the magnitude of motion MMag(f) in each of the frames f of the video has been computed, the first motion frequency feature $feat_{motf1}$ is computed using the following equation:

$$feat_{motf1} = \frac{1}{\#frames - 1} \sum_{f=2}^{\#frames} Mot1(f),$$

$$\text{where } Mot1(f) = \begin{cases} 1 & \text{if } MMag(f) \ge T_{motf1} \\ 0 & \text{otherwise} \end{cases},$$

and $T_{motf1}$ is a prescribed motion frequency threshold. $feat_{motf1}$ thus measures the percentage of frames in the video where the magnitude of motion is greater than or equal to $T_{motf1}$. Similarly, the second motion frequency feature $feat_{motf2}$ is computed using the following equation:

$$feat_{motf2} = \frac{1}{\#frames - 1} \sum_{f=2}^{\#frames} Mot2(f),$$

$$\text{where } Mot2(f) = \begin{cases} 1 & \text{if } MMag(f) \ge T_{motf2} \\ 0 & \text{otherwise} \end{cases},$$

and $T_{motf2}$ is another prescribed motion frequency threshold which is greater than $T_{motf1}$. $feat_{motf2}$ thus measures the percentage of frames in the video where the magnitude of motion is greater than or equal to $T_{motf2}$.

2.3.3.2 Amount of Motion Features

Figure 13:
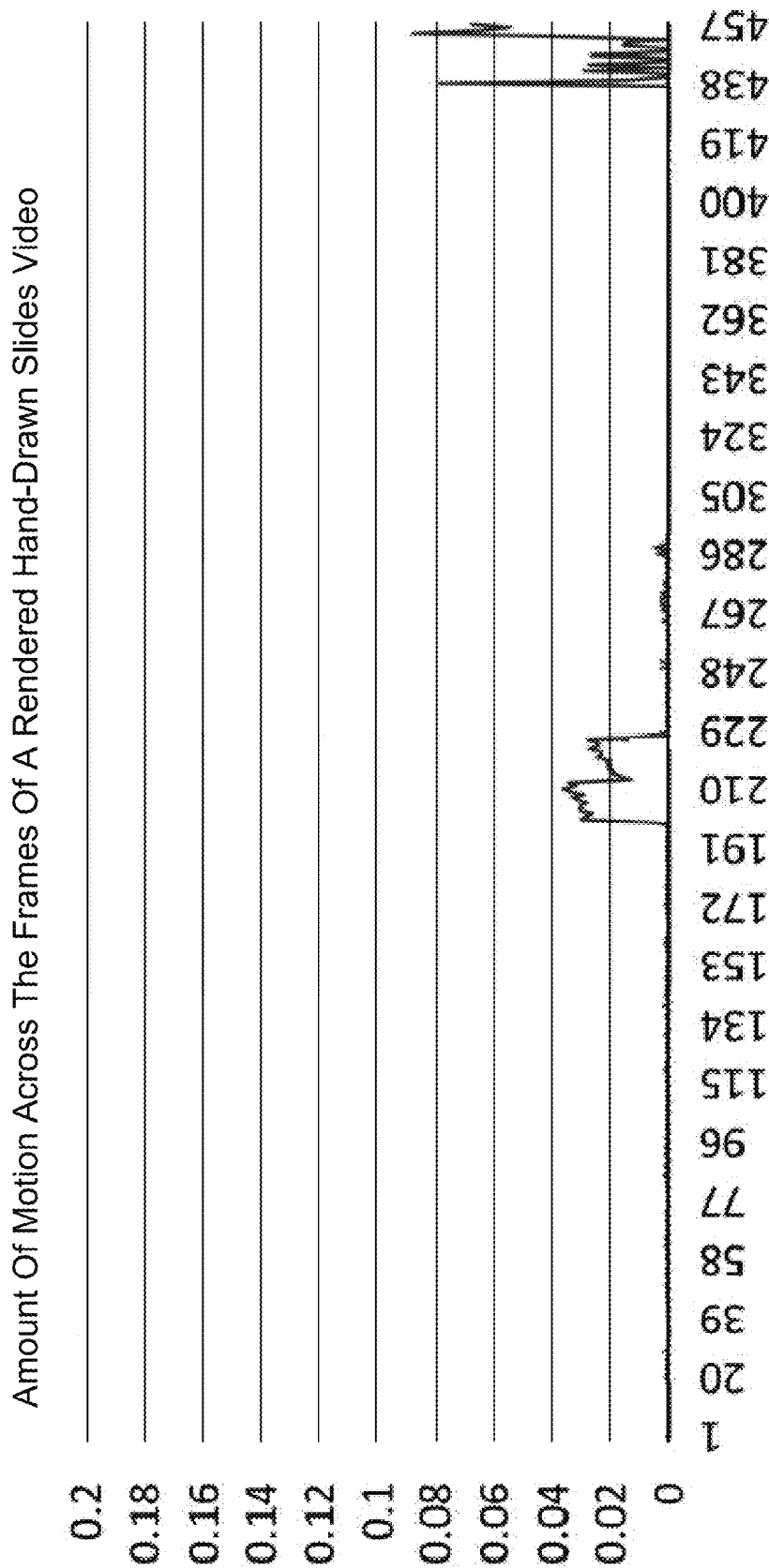
FIG. 13 is a line graph illustrating the fraction of moving pixels across the frames of an exemplary rendered hand-drawn slides video.
Figure 14:
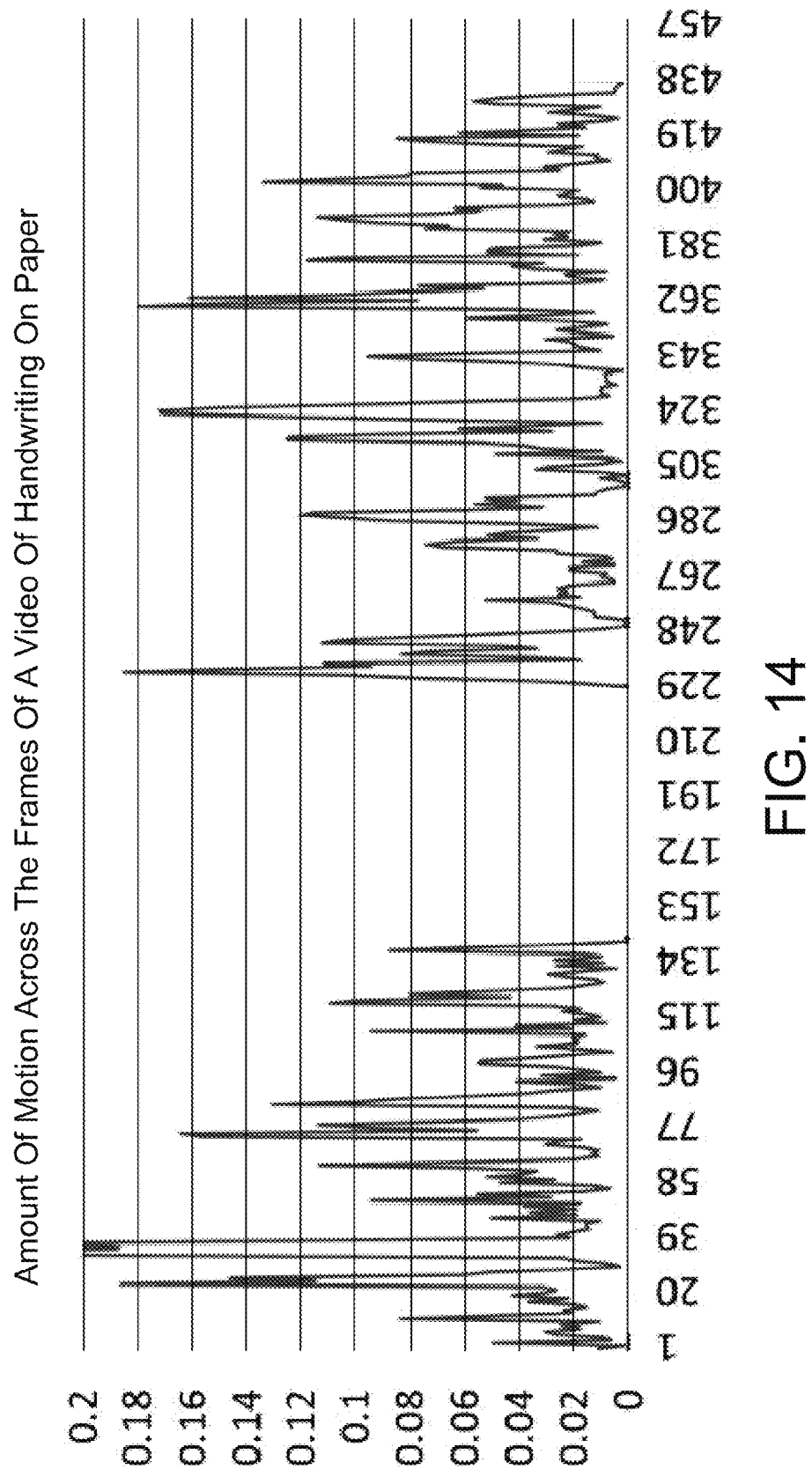
FIG. 14 is a line graph illustrating the fraction of moving pixels across the frames of an exemplary video of handwriting on paper.

As described heretofore, the amount of motion features measure how much motion takes place in a given educational video. In an exemplary implementation of the presentation style identification technique described herein the amount of motion in the video is determined by measuring the number of pixels in the video whose intensity changes from one frame of the video to the next. Pixels whose intensity changes from one video frame to the next are herein sometimes referred to as moving pixels. It will be appreciated that the amount of motion in a given educational video varies considerably across the 11 different presentation styles described herein. In other words, in some types of educational videos there is a very small amount of motion therein, whereas in other types of educational videos there is a large amount of motion therein. For instance, in a rendered hand-drawn slides video the intensity of just a very small number of pixels in the video will change from one video frame to the next (e.g., just the pixels that are currently being edited), whereas in a video of handwriting on paper a much larger number of pixels in the video will change from one video frame to the next because the person's hand that is performing the handwriting is visible in the video and is moving. These facts are illustrated in FIGS. 13 and 14 respectively. More particularly, FIG. 13 illustrates the amount of motion across the frames of an exemplary rendered hand-drawn slides video, and FIG. 14 illustrates the amount of motion across the frames of an exemplary video of handwriting on paper.

The amount of motion features include a first motion amount feature denoted by $feat_{mota1}$, and a second motion amount feature denoted by $feat_{mota2}$. Exemplary implementations of methods for computing these two features for an exemplary educational video will now be described in more detail. It is noted that various other methods can also be used to compute these features.

Whenever the educational video is in color, each of the frames f of the video is first converted from color to grayscale. Given that MOV1(f, X, y) denotes whether or not the grayscale pixel (x, y) of a given frame f of the video is moving according to a prescribed motion pixel threshold denoted by $T_{motpix1}$, MOV1(f, x, y) is computed for each of the frames f of the video using the following equation:

$$Mov1(f, x, y) = \begin{cases} 1 & \text{if } |I_{x,y}(f) - I_{x,y}(f-1)| \geq T_{motpix1} \\ 0 & \text{otherwise} \end{cases}.$$

Given that FracMov1(f) denotes the fraction of moving pixels in a given frame f of the video according to the prescribed motion pixel threshold $T_{motpix1}$, FracMov1(f) is computed for each of the frames f of the video using the following equation:

$$FracMov1(f) = \frac{1}{\#\text{pixels}} \sum_{x,y} Mov1(f, x, y).$$

Similarly, given that Mov2(f, x, y) denotes whether or not the grayscale pixel (x, y) of a given frame f of the video is moving according to another prescribed motion pixel threshold denoted by $T_{motpix2}$, where $T_{motpix2}$ is greater than $T_{motpix1}$, Mov2(f, x, y) is computed for each of the frames f of the video using the following equation:

$$Mov2(f, x, y) = \begin{cases} 1 & \text{if } |I_{x,y}(f) - I_{x,y}(f-1)| \geq T_{motpix2} \\ 0 & \text{otherwise} \end{cases}.$$

Given that FracMov2(f) denotes the fraction of moving pixels in a given frame f of the video according to the prescribed motion pixel threshold $T_{motpix2}$, FracMov2(f) is computed for each of the frames f of the video using the following equation:

$$FracMov2(f) = \frac{1}{\#\text{pixels}} \sum_{x,y} Mov2(f, x, y).$$

In order to make the amount of motion class of motion features robust to very large amounts of motion (which can occur during transitions in a given video, among other times), the first motion amount feature $feat_{mota1}$ is computed using the following equation:

$$feat_{mota1} = Percentile_f(FracMov1(f), T_{mota}),$$

where $T_{mota}$ is a prescribed motion amount threshold, and $Percentile_f$ sorts the values of FracMov1(f) across all of the frames of the educational video and then selects the value of FracMov1(f) at the $T_{mota}$ percentile. Similarly, the second motion amount feature $feat_{mota2}$ is computed using the following equation:

$$feat_{mota2} = Percentile_f(FracMov2(f), T_{mota}),$$

where $Percentile_f$ sorts the values of FracMov2(f) across all of the frames of the video and then selects the value of FracMov2(f) at the $T_{mota}$ percentile.

2.3.3.3 Type of Motion Features

It will be appreciated that the type of motion in a given educational video also varies considerably across the 11 different presentation styles described herein. In other words, in some presentation styles the motion is largely rigid, while in other presentation styles there is a lot of non-rigid motion. For example, during a given Ken Burns effect in a rendered photographs video the motion might be a single "rigid" pan and zoom, whereas in a natural video the motion will likely have lots of different non-rigid components.

The type of motion features include a first motion type feature denoted by $feat_{mott1}$, a second motion type feature denoted by $feat_{mott2}$, and a third motion type feature denoted by $feat_{mott3}$. Exemplary implementations of methods for computing these three features for an exemplary educational video will now be described in more detail. It is noted that various other methods can also be used to compute these features.

Given that NRFlow(f) denotes the magnitude of non-rigid motion between a given frame f of the educational video and the immediately succeeding frame (f+1) of the video, NRFlow(f) is estimated for each of the frames f of the video as follows. The magnitude of optical flow across the whole frame f, herein denoted as OFlow(f), is first computed. As is appreciated in the art of image processing, optical flow is the distribution of apparent motion of objects, surfaces, and edges in a visual scene caused by the relative motion between an observer (e.g., a video camera, or the like) and the scene. In an exemplary implementation of the presentation style identification technique described herein, this optical flow magnitude computation is performed using a conventional Horn-Schunck method of determining optical flow. A rigid pan and zoom parametric motion across the whole frame f is then estimated from OFlow(f). In an exemplary implementation of the presentation style identification technique described herein, this rigid pan and zoom parametric motion estimation is performed using a conventional hierarchical model-based motion estimation method. NRFlow(f) is then computed by subtracting the estimated rigid pan and zoom parametric motion from OFlow(f) across the whole frame f, and then computing the magnitude of the result of this subtraction.

After NRFlow(f) has been computed for each of the frames f of the educational video, the first motion type feature $feat_{mott1}$ is computed using the following equation:

$$feat_{mott1} = Percentile_f(NRFlow(f), T_{mott1}),$$

where $T_{mott1}$ is a prescribed motion type threshold, and $Percentile_f$ sorts the values of NRFlow(f) across all of the frames of the video and then selects the value of NRFlow(f) at the $T_{mott1}$ percentile. It will be appreciated that this computation of $feat_{mott1}$ makes the type of motion class of motion features robust to extreme motions during transitions. The second motion type feature $feat_{mott2}$ can similarly be computed using the following equation:

$$feat_{mott2} = Percentile_f(NRFlow(f)/OFlow(f), T_{mott2}),$$

where $T_{mott2}$ is another prescribed motion type threshold, NRFlow(f)/OFlow(f) denotes the fraction of OFlow(f) that is non-rigid, and $Percentile_f$ sorts the values of NRFlow(f)/OFlow(f) across all of the frames of the video and then selects the value of NRFlow(f)/OFlow(f) at the $T_{mott2}$ percentile. The third motion type feature $feat_{mott3}$ can similarly be computed using the following equation:

$$feat_{mott3} = Percentile_f(OFRes(f), T_{mott3}),$$

where $T_{mott3}$ is yet another prescribed motion type threshold, OFRes(f) denotes an optical flow residual that generally indicates the degree to which changes between frame f and the immediately succeeding frame (f+1) of the video are due to the motion of scene elements in the video, and $Percentile_f$ sorts the values of OFRes(f) across all of the frames of the video and then selects the value of OFRes(f) at the $T_{mott3}$ percentile. It will thus be appreciated that $feat_{mott3}$ measures whether the frame-to-frame changes in the video are due to the motion of scene elements in the video (generally resulting in a small optical flow residual) or are due to the appearance and subsequent disappearance of scene elements in the video (e.g., as takes place in a slide show, generally resulting in a large optical flow residual). It will also be appreciated that a video which includes significant motion of scene elements but also includes a significant amount of noise will also generate a high optical flow residual. Thus, $feat_{mott3}$ also provides another estimate of the noise in the video, in addition to the aforementioned noise $feat_{noise}$.

2.4 Video Presentation Style Classifier

Figure 15:
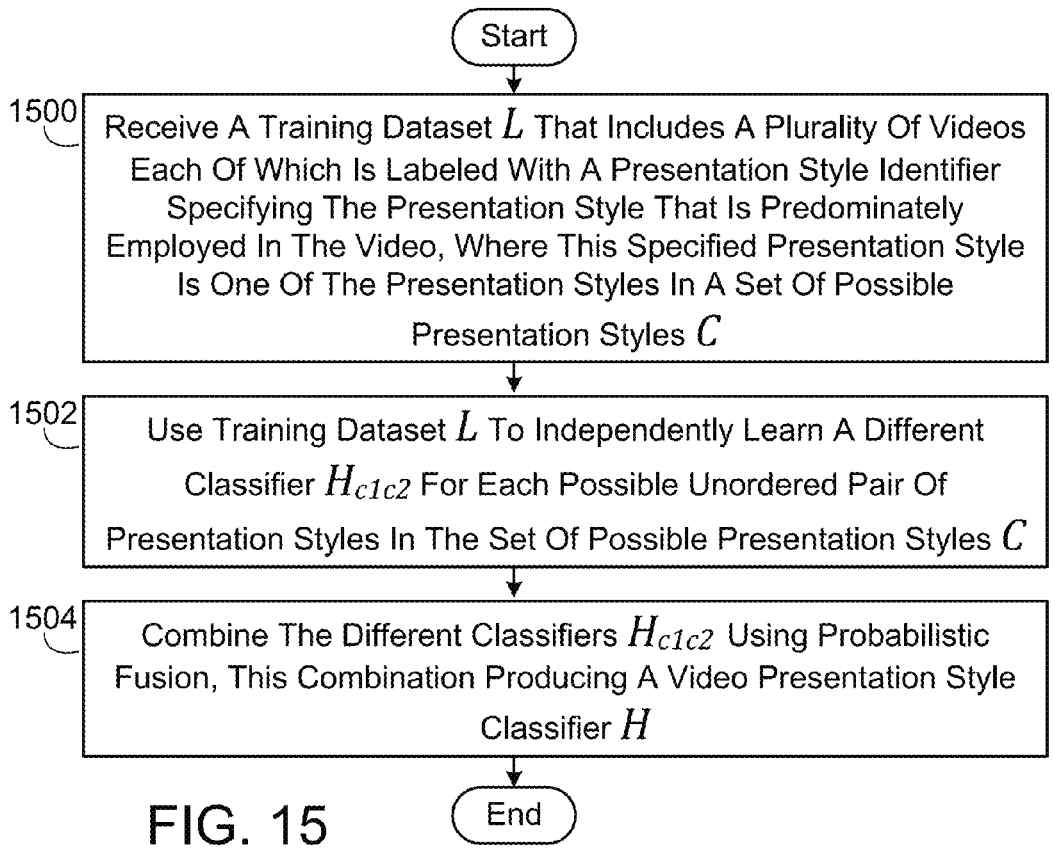
FIG. 15 is a flow diagram illustrating an exemplary implementation, in simplified form, of a process for learning a video presentation style classifier that can be used to determine the presentation style that is predominately employed in a given educational video.

FIG. 15 illustrates an exemplary implementation, in simplified form, of a process for learning a video presentation style classifier H that can be used to determine (e.g., infer) the presentation style that is predominately employed in any educational video. FIG. 16 illustrates a corresponding exemplary implementation, in simplified form, of pseudo-code for learning the classifier H. In an exemplary implementation of the presentation style identification technique described herein the video presentation style classifier learning process exemplified in FIG. 15 and the pseudo-code exemplified in FIG. 16 leverage the aforementioned 11 different presentation styles that can be employed in educational videos, and also leverage the aforementioned image features, face features and motion features that can be used to represent educational videos.

As exemplified in FIGS. 15 and 16, the process for learning a video presentation style classifier H starts with receiving a training dataset L that includes a plurality of educational videos each of which is labeled with a presentation style identifier specifying the presentation style that is predominately employed in the video, where this specified presentation style is one of the presentation styles in a set of possible presentation styles C that can be employed in educational videos (action 1500). A set of features that represents each of the videos in L is also computed therefor. In other words, $L=\{x^1, y^1, \ldots, x^n, y^n\}$, where n denotes the total number of videos in L, $x^j$ denotes the aforementioned set of 21 different features that is used to represent video j, $y^j$ denotes the presentation style that is predominately employed in video j, and $y^j \in C$. Accordingly, the 21 different features are computed for each of the videos in the training dataset L. Each of the videos in the training dataset L is also labeled with the presentation style that is predominately employed in the video. In an exemplary implementation of the presentation style identification technique described herein the set of possible presentation styles C includes the 11 different presentation styles described herein (in other words, $C=\{c_1, \ldots, c_{11}\}$). Generally speaking and as is described in more detail hereafter, the combination of the training dataset L and a prescribed instantiation of a conventional stacked generalization scheme are used to learn the classifier H. The stacked generalization scheme instantiation that is used by the presentation style identification technique implementations described herein is advantageous in that it provides a rich framework for combining various feature sets and classifiers in a manner that increases the robustness and generalization of the resulting classifier H.

Referring again to FIGS. 15 and 16, after the training dataset L has been received (action 1500), L is used to independently learn a different classifier $H_{c_1 c_2}$ for each possible unordered pair of presentation styles in the set of possible presentation styles C (action 1502). These different classifiers $H_{c_1 c_2}$ are then combined using probabilistic fusion, this combination producing the video presentation style classifier H (action 1504). In other words, the classifier H is generated by fusing the all of the different classifiers $H_{c_1 c_2}$ in a principled probabilistic manner. It will be appreciated that some of the presentation styles in C have shared characteristics that overlap considerably with others of the presentation styles in C. For instance, both the rendered slide show that includes a video of the presenter presentation style and the video of an interview presentation style have a presenter in the video. In an exemplary implementation of the presentation style identification technique described herein the different classifier that is independently learned for each possible unordered pair of presentation styles in the set of possible presentation styles is a three-way classifier. The use of three-way classifiers to generate the classifier H is advantageous since three-way classifiers are maximally discriminative. In other words, the three-way classifiers systematically focus on regions of the discriminant surface between pairs of presentation styles in C, while treating the remaining styles (e.g., those that are not part of a given unordered pair) as noise. It is noted that alternate implementations of the presentation style identification technique are also possible where the different classifier that is independently learned for each possible unordered pair of presentation styles can be another type of classifier such as a binary (i.e., two-way) classifier, among others.

In an exemplary implementation of the presentation style identification technique described herein where the set of possible presentation styles C includes the aforementioned 11 different presentation styles, it will be appreciated that action 1502 of FIG. 15 will result in a total of $\mathcal{K} = 11 \times 10/2$ different classifiers $H_{c_1 c_2}$ being learned. As exemplified in FIG. 16, in the just-described implementation of the presentation style identification technique where these $\mathcal{K}$ different classifiers $H_{c_1 c_2}$ are three-way classifiers, each of the $\mathcal{K}$ different three-way classifiers $H_{c_1 c_2}$ is learned between a given unordered pair of presentation styles in the set of possible presentation styles C and an additional background category ⊥ that includes all of the different presentation styles in C except for those that are in the given unordered pair. It will be appreciated that the additional background category ⊥ captures the possibility that the true presentation style that is predominately employed in a given educational video is different than the presentation styles in the given unordered pair. The training dataset L is divided into two non-overlapping subsets of labeled educational videos, namely training subset B and training subset S, which are used as follows. Training subset B is used to train each of the $\mathcal{K}$ different three-way classifiers $H_{c_1 c_2}$. Once all of the $\mathcal{K}$ different three-way classifiers $H_{c_1 c_2}$ have been trained, each training sample $(x, y) \in S$ is represented using Z which is made up of $3 \times \mathcal{K}$ features, namely the prediction probabilities from the $\mathcal{K}$ different three-way classifiers $H_{c_1 c_2}$. The elements of Z along with their corresponding labels are then used to create a new training dataset $L'_S$ which is used to train the video presentation style classifier H.

In an exemplary implementation of the presentation style identification technique described herein each of the $\mathcal{K}$ different classifiers $H_{c_1 c_2}$ and the video presentation style classifier H are trained using a conventional Decision Forests method. As is appreciated in the art of machine learning, a Decision Forest is an ensemble of D decision trees $\{\mathcal{T}^i\}$, where each of the decision trees $\mathcal{T}^i$ in the ensemble is independently trained using a random subset of feature-value combinations. During prediction (GETPREDICTIONPROBABILITIES), the output from each of the decision trees $\mathcal{T}^i$ is combined to make the overall prediction for the forest. The presentation style identification technique implementations described herein employ an additive model for prediction so that:

$$p(c = c_j | x, \{\mathcal{T}^i\}) = \frac{\Sigma_i p(c = c_j | x, \mathcal{T}^i)}{D}.$$

Each of the decision trees $\mathcal{T}^i$ is trained over a randomly chosen prescribed percentage (e.g., 25 percent) of the features in the aforementioned set of 21 different features, and is searched over all values of these features. In order to address skewness in the training dataset L, L is balanced using repeated sampling with replacement, where mutual information is used as the splitting criteria. The training of each of the forests is controlled by three different parameters, namely, the number of trees in the forest, the maximum tree depth, and the maximum imbalance when splitting a node.

In a tested implementation of the presentation style identification technique described herein the just-described learned video presentation style classifier was used to determine the presentation style that is predominately employed in each of the educational videos in the aforementioned dataset of videos that are retrieved as relevant to a textbook, and dataset of videos with transcripts. Upon comparing the classifier's presentation style determination to the ground-truth label for each of the videos in these two datasets, the classifier proved to be able to determine the presentation style that is predominately employed in each of these videos with a high degree of accuracy.

2.5 Presentation Style Identification

Figure 17:
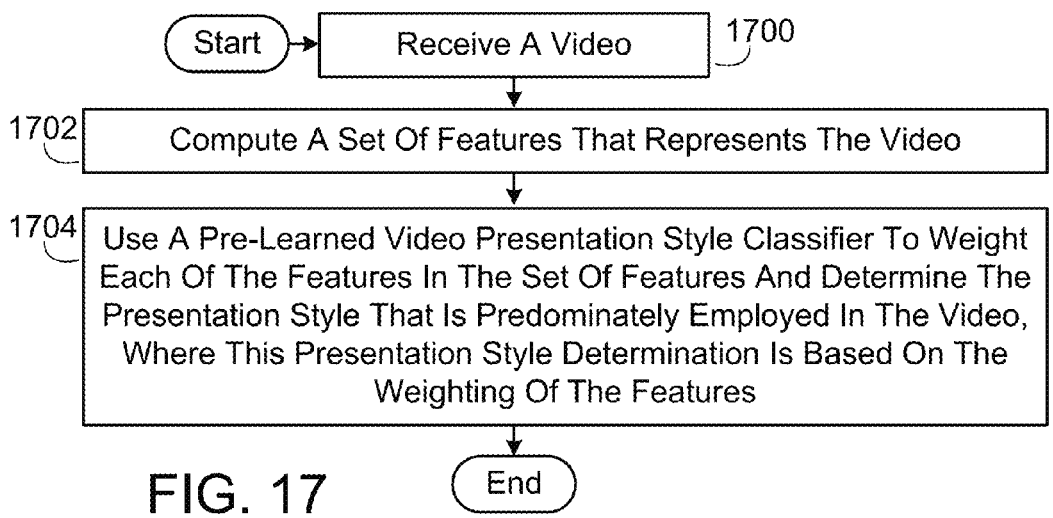
FIG. 17 is a flow diagram illustrating an exemplary implementation, in simplified form, of a process for identifying the presentation style of a video.

FIG. 17 illustrates an exemplary implementation, in simplified form, of a process for identifying the presentation style of a video. As exemplified in FIG. 17, the process starts with receiving the video (action 1700). A set of features that represents the video is then computed (action 1702). A pre-learned video presentation style classifier is then used to weight each of the features in the set of features and determine the presentation style that is predominately employed in the video, where this presentation style determination is based on the weighting of the features (action 1704).

Figure 18:
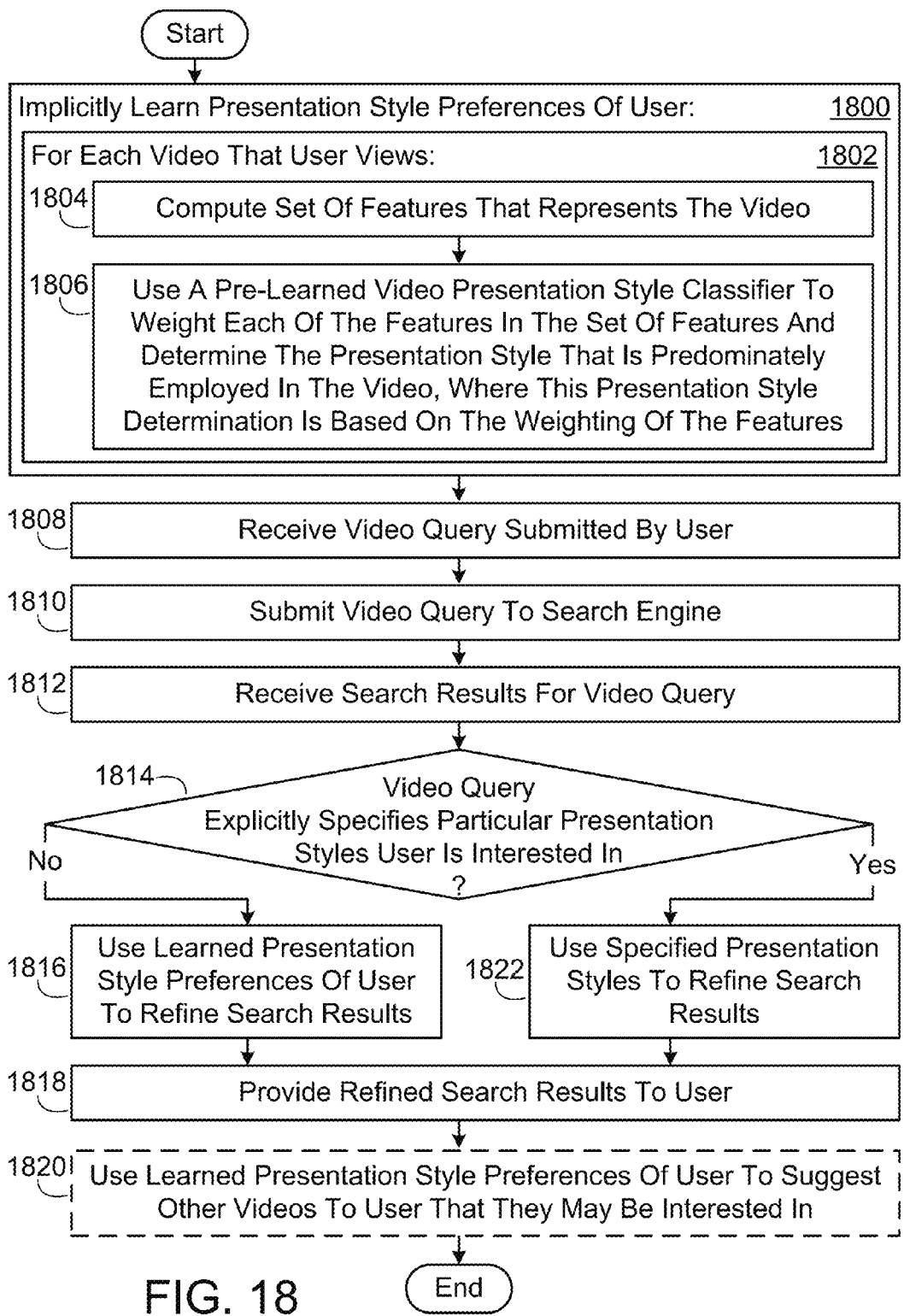
FIG. 18 is a flow diagram illustrating an exemplary implementation, in simplified form, of a process for allowing a user to search for videos.

FIG. 18 illustrates an exemplary implementation, in simplified form, of a process for allowing a user to search for videos. As exemplified in FIG. 18, the process starts with implicitly learning the presentation style preferences of the user (action 1800), where this implicit learning is implemented as follows. For each video that the user views (action 1802), a set of features is computed that represents the video (action 1804), and a pre-learned video presentation style classifier is then used to weight each of the features in the set of features and determine the presentation style that is predominately employed in the video, where this presentation style determination is based on the weighting of the features (action 1806). A video query that is submitted by the user is then received (action 1808), and submitted to a search engine (action 1810). Search results for the video query are then received from the search engine (action 1812), where the search results include any videos that the search engine found that match the video query. Then, whenever the video query does not explicitly specify one or more particular presentation styles that the user is interested in (action 1814, No), the learned presentation style preferences of the user are used to refine the search results (action 1816), and the refined search results are provided to the user (action 1818). The learned presentation style preferences of the user can optionally also be used to suggest other videos to the user that they may be interested in (action 1820).

The learned presentation style preferences of the user can be used to refine the search results in various ways such as the following. In one implementation of the presentation style identification technique described herein the learned presentation style preferences of the user can be used to filter the search results such that the refined search results are restricted to videos that match these preferences. In another implementation of the presentation style identification technique the learned presentation style preferences of the user can be used to rank order the search results such that videos matching these preferences appear at the top of the refined search results.

Referring again to FIG. 18, whenever the video query explicitly specifies one or more particular presentation styles that the user is interested in (action 1814, Yes), these specified presentation styles are used to refine the search results (action 1822). The specified presentation styles can be used to refine the search results in various ways such as the following. In one implementation of the presentation style identification technique described herein the specified presentation styles can be used to filter the search results such that the refined search results are restricted to videos that match the specified presentation styles. In another implementation of the presentation style identification technique the specified presentation styles can be used to rank order the search results such that videos matching the specified presentation styles appear at the top of the refined search results.

Figure 19:
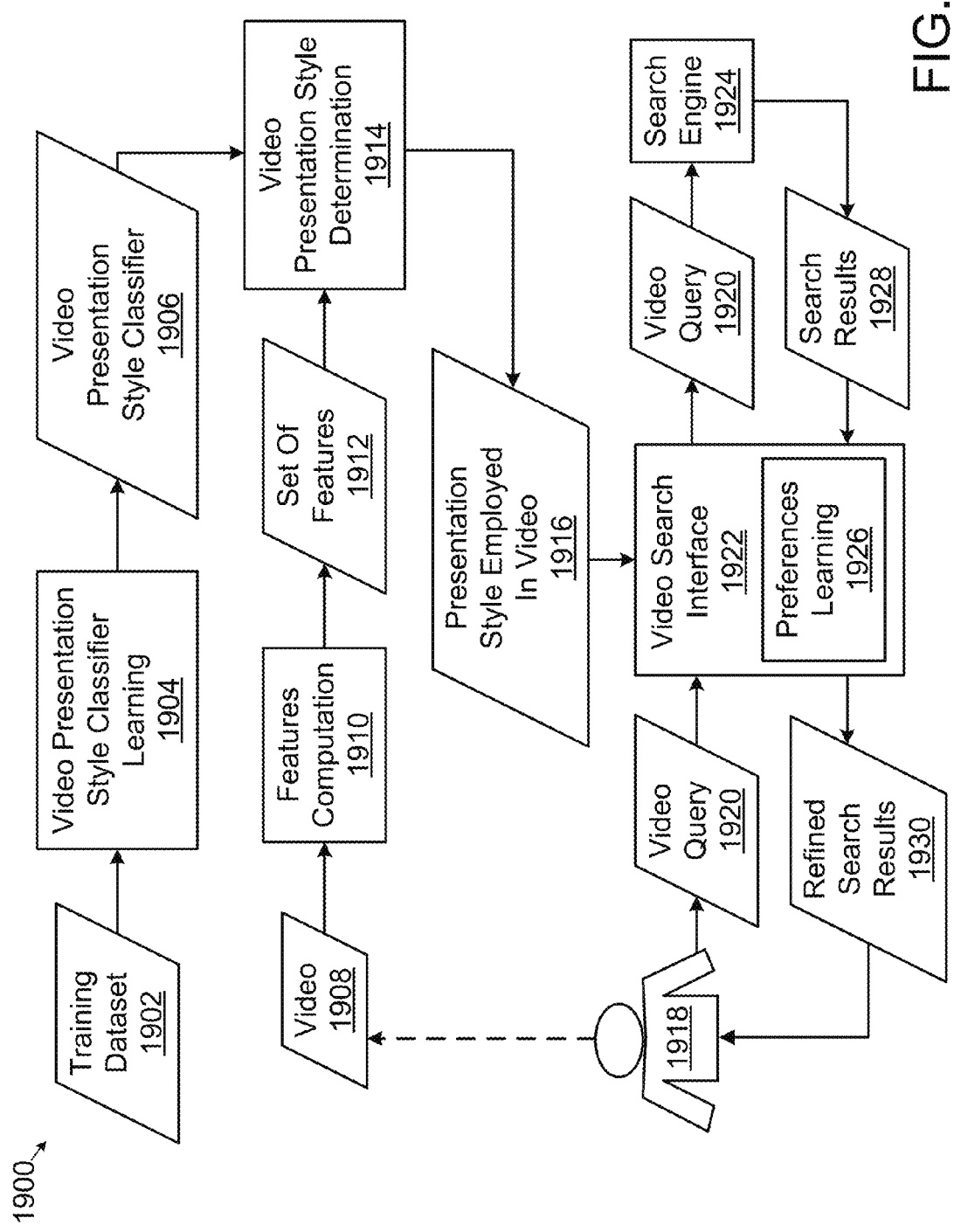
FIG. 19 is a diagram illustrating an exemplary implementation, in simplified form, of an architectural framework for realizing the presentation style identification technique implementations described herein.

FIG. 19 illustrates an exemplary implementation, in simplified form, of an architectural framework for realizing the presentation style identification technique implementations described herein. As exemplified in FIG. 19, the architectural framework 1900 includes a video presentation style classifier learning module 1904, a features computation module 1910, a video presentation style determination module 1914, a video search interface module 1922 which includes a preferences learning component 1926, and a search engine module 1924. The features computation module 1910 and the video presentation style determination module 1914 are employed in the realization of the aforementioned process for identifying the presentation style for a video. More particularly, the features computation module 1910 receives the video 1908 and computes a set of features 1912 that represents the video. The video presentation style determination module 1914 uses a pre-learned video presentation style classifier 1906 to weight each of the features in the set of features 1912 and determine the presentation style that is predominately employed in the video 1916.

Referring again to FIG. 19, the video presentation style classifier learning module 1904 is employed in the realization of the aforementioned process for learning a video presentation style classifier. More particularly, the video presentation style classifier learning module 1904 receives the training dataset 1902 and uses it to produce the video presentation style classifier 1906.

Referring again to FIG. 19, the features computation module 1910, the video presentation style determination module 1914, the video search interface module 1922, and the search engine module 1924 are employed in the realization of the aforementioned process for allowing a user to search for videos. More particularly, for each video 1908 that the user 1918 views, the features computation module 1910 computes a set of features 1912 that represents the video, and the video presentation style determination module 1914 uses the pre-learned video presentation style classifier 1906 to weight each of the features in the set of features and determine the presentation style that is predominately employed in the video 1916. The preferences learning component 1926 of the video search interface module 1922 then uses the determined presentation style that is predominately employed in the video 1916 to implicitly learn the presentation style preferences of the user 1918. The video search interface 1922 receives the video query 1920 that is submitted by the user 1918, and submits the video query to the search engine 1924. The video search interface 1922 then receives the search results 1928 from the search engine 1924. Whenever the video query 1920 does not explicitly specify one or more particular presentation styles that the user 1918 is interested in, the video search interface 1922 uses the implicitly learned presentation style preferences of the user to refine the search results 1928, and then provides the refined search results 1930 to the user.

3.0 Additional Implementations

While the presentation style identification technique has been described by specific reference to implementations thereof, it is understood that variations and modifications thereof can be made without departing from the true spirit and scope of the presentation style identification technique. For example, in the case where a given educational video includes an audio track, the presentation style that is predominately employed in the video can be determined by using the audio track in conjunction with the presentation style identification technique implementations described herein. In the case where additional information is available about a given educational video (such as either a transcript of the video, or the creator of the video, or a combination thereof, among other types of additional information), the presentation style that is predominately employed in the video can be determined by using this additional information in conjunction with the presentation style identification technique implementations described herein. In the case where a user is watching a particular video on a given website, or is reading a particular electronic book using a given reading application, the presentation style identification technique implementations described herein can be used to suggest videos to the user that are attuned to the user's preferences and thus may be of interest to the user.

It is also noted that any or all of the aforementioned implementations can be used in any combination desired to form additional hybrid implementations. Although the presentation style identification technique implementations have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Exemplary Operating Environments

Figure 20:
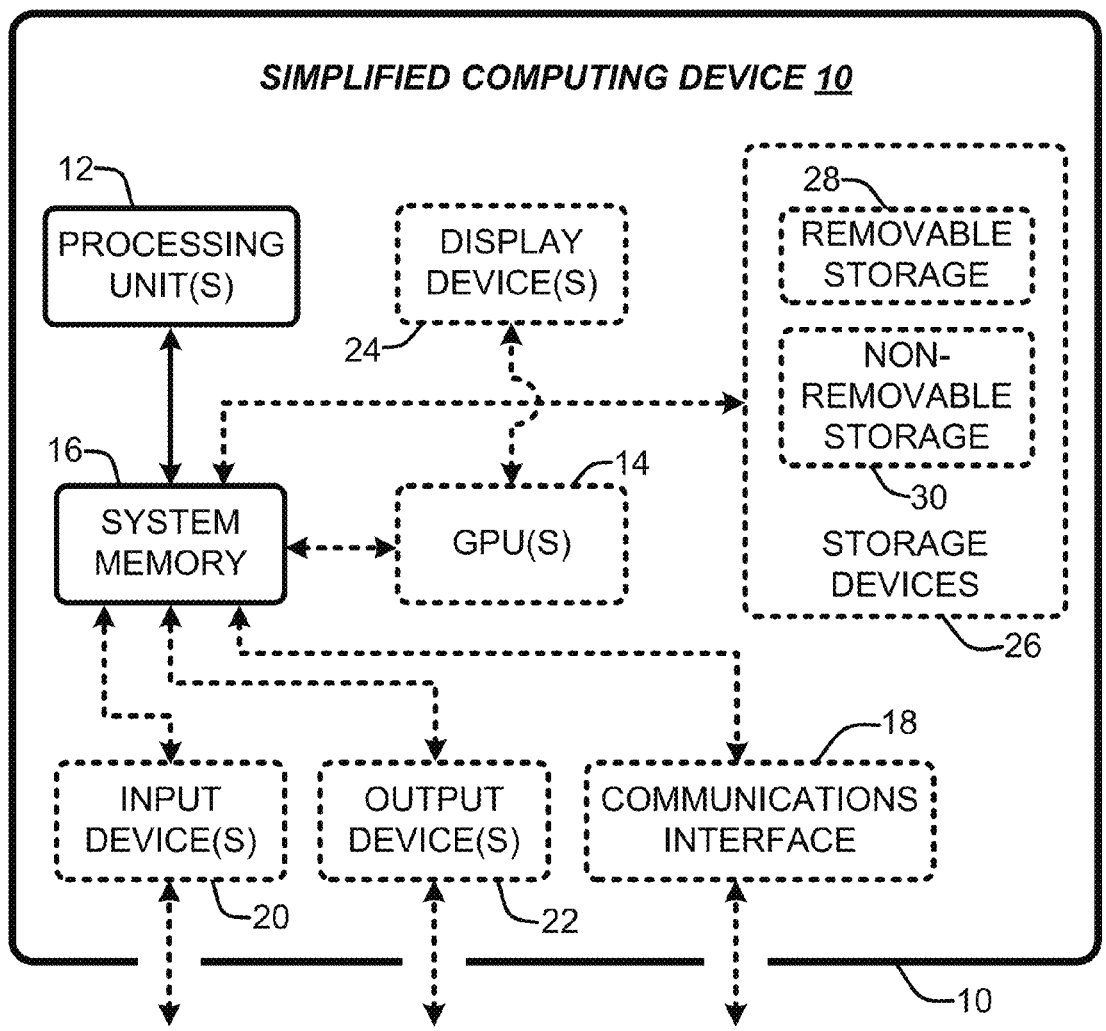
FIG. 20 is a diagram illustrating a simplified example of a general-purpose computer system on which various implementations and elements of the presentation style identification technique, as described herein, may be realized.

The presentation style identification technique implementations described herein are operational within numerous types of general purpose or special purpose computing system environments or configurations. FIG. 20 illustrates a simplified example of a general-purpose computer system on which various implementations and elements of the presentation style identification technique, as described herein, may be implemented. It is noted that any boxes that are represented by broken or dashed lines in the simplified computing device 10 shown in FIG. 20 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the presentation style identification technique implementations described herein, the device should have a sufficient computational capability and system memory to enable basic computational operations. In particular, the computational capability of the simplified computing device 10 shown in FIG. 20 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 shown in FIG. 20 may also include other components such as a communications interface 18. The simplified computing device 10 may also include one or more conventional computer input devices 20 (e.g., pointing devices, keyboards, audio (e.g., voice) input devices, video input devices, haptic input devices, gesture recognition devices, devices for receiving wired or wireless data transmissions, and the like). The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 20 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EE-PROM), flash memory or other memory technology, magnetic cassettes, magnetic tapes, magnetic disk storage, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various presentation style identification technique implementations described herein, or portions thereof, may be stored, received, transmitted, or read from any desired combination of computer-readable or machine-readable media or storage devices and communication media in the form of computer-executable instructions or other data structures.

Finally, the presentation style identification technique implementations described herein may be further described in the general context of computer-executable instructions, such as program modules, being executed by a computing device. Generally, program modules include routines, programs, objects, components, data structures, and the like, that perform particular tasks or implement particular abstract data types. The presentation style identification technique implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Wherefore, what is claimed is:

1. A computer-implemented process for identifying the presentation style of a video, comprising the actions of:
   using one or more computing devices that are in communication with each other via a computer network to perform the following process actions:
   receiving the video;
   computing a set of image features that are computed for each frame of the video independently, the image features comprising one or more of,
   a low-contrast feature measuring pixel intensity statistics for the video according to a prescribed low-contrast threshold, or
   a high-contrast feature measuring pixel intensity statistics for the video according to a prescribed high-contrast threshold, or
   a zero-gradients feature measuring the amount of zero gradients that exist in the video, or
   a low-gradients feature measuring the amount of weak but non-zero gradients that exist in the video, or
   a high-gradients feature measuring the amount of strong gradients that exist in the video, or
   a noise feature measuring the amount of pixel intensity noise that exists in the video; and
   using a pre-learned video presentation style classifier to weight each of the image features in said set and determine a presentation style that is predominately employed in the video, said presentation style determination being based on the weighting of said features.

2. The process of claim 1, wherein the determined presentation style comprises a one of the presentation styles in a set of possible presentation styles comprising:
   a rendered video class of presentation styles; and
   a real-world video class of presentation styles.

3. The process of claim 2, wherein the video comprises an educational video, and the rendered video class of presentation styles comprises one or more of:
   a rendered slide show presentation style; or
   a rendered slide show comprising a video of a presenter presentation style; or
   a rendered animation presentation style; or
   a rendered photographs presentation style; or
   a rendered hand-drawn slides presentation style.

4. The process of claim 2, wherein the video comprises an educational video, and the real-world video class of presentation styles comprises one or more of:
   a natural video presentation style; or
   a video of an interview presentation style; or
   a video of handwriting on paper presentation style; or
   a video of projected slides presentation style; or
   a video of a whiteboard presentation style; or
   a video of a blackboard presentation style.

5. A computer-implemented process for identifying the presentation style of a video, comprising the actions of:
   using one or more computing devices that are in communication with each other via a computer network to perform the following process actions:
   receiving the video;
   computing a set of face features that represent the video, wherein the face features are based on the detection of one or more faces in the video, the face features comprising one or more of,
      a face detection feature measuring the percentage of frames in the video where just one face is detected, or
      one or more moving face features each measuring, for each frame of the video where just one face is detected, whether or not said detected face is moving, or
      a face not present feature measuring the length of the longest sequence of frames in the video where no face is detected, or
      a face present feature measuring the length of the longest sequence of frames in the video where just one face is detected, or
      a face size feature measuring, across the frames in the video where just one face is detected, the average size of said detected face; and
   using a pre-learned video presentation style classifier to weight each of the face features in said set and determine a presentation style that is predominately employed in the video, said presentation style determination being based on the weighting of said features.

6. The process of claim 5, wherein the determined presentation style comprises a one of the presentation styles in a set of possible presentation styles comprising:
   a rendered video class of presentation styles; and
   a real-world video class of presentation styles.

7. The process of claim 6, wherein the video comprises an educational video, and the rendered video class of presentation styles comprises one or more of:
   a rendered slide show presentation style; or
   a rendered slide show comprising a video of a presenter presentation style; or
   a rendered animation presentation style; or
   a rendered photographs presentation style; or
   a rendered hand-drawn slides presentation style.

8. The process of claim 6, wherein the video comprises an educational video, and the real-world video class of presentation styles comprises one or more of:
   a natural video presentation style; or
   a video of an interview presentation style; or
   a video of handwriting on paper presentation style; or
   a video of projected slides presentation style; or
   a video of a whiteboard presentation style; or
   a video of a blackboard presentation style.

9. A computer-implemented process for identifying the presentation style of a video, comprising the actions of:
   using one or more computing devices that are in communication with each other via a computer network to perform the following process actions:
   receiving the video;
   computing a set of motion features that represent the video, wherein the motion features are based on how the video changes from frame to frame, the motion features comprising one or more of,
      frequency of motion features measuring how often motion occurs in the video, or
      amount of motion features measuring how much motion takes place in the video, or
      type of motion features specifying the type of motion that takes place in the video; and
   using a pre-learned video presentation style classifier to weight each of the motion features in said set and determine a presentation style that is predominately employed in the video, said presentation style determination being based on the weighting of said features.

10. The process of claim 9, wherein the frequency of motion features comprise one or more of:
   a motion frequency feature measuring the percentage of frames in the video where the magnitude of motion is greater than or equal to a prescribed motion frequency threshold; or
   another motion frequency feature measuring the percentage of frames in the video where the magnitude of motion is greater than or equal to another prescribed motion frequency threshold; or
   a motion present feature measuring the length of the longest sequence of frames in the video where there is motion; or
   a motion not present feature measuring the length of the longest sequence of frames in the video where there is no motion.

11. The process of claim 9, wherein the amount of motion features comprise one or more of:
   a motion amount feature measuring the number of pixels in the video whose intensity changes between successive frames of the video according to a prescribed motion pixel threshold; or
   another motion amount feature measuring the number of pixels in the video whose intensity changes between successive frames of the video according to another prescribed motion pixel threshold.

12. The process of claim 9, wherein the type of motion features comprise one or more of:
   a motion type feature ($feat_{mott1}$) given by the equation $feat_{mott1}=Percentile_f (NRFlow(f), T_{mott1})$, NRFlow(f) denoting the magnitude of non-rigid motion between a given frame (f) of the video and the immediately succeeding frame (f+1) of the video, $T_{mott1}$ denoting a prescribed motion type threshold, and $Percentile_f$ sorting the values of NRFlow(f) across all of the frames of the video and then selecting the value of NRFlow(f) at the $T_{mott1}$ percentile; or
   another motion type feature ($feat_{mott2}$) given by the equation $feat_{mott2}=Percentile_f (NRFlow(f)/OFlow(f), T_{mott2})$, OFlow(f) denoting the magnitude of optical flow across frame f, $T_{mott2}$ denoting another prescribed motion type threshold, NRFlow(f)/OFlow(f) denoting the fraction of OFlow(f) that is non-rigid, and $Percentile_f$ sorting the values of NRFlow(f)/OFlow(f) across all of the frames of the video and then selecting the value of NRFlow(f)/OFlow(f) at the $T_{mott2}$ percentile; or
   yet another motion type feature ($feat_{mott3}$) given by the equation $feat_{mott3}=Percentile_f (OFRes(f),T_{mott3})$, OFRes(f) denoting an optical flow residual indicating the degree to which changes between frame f and frame f+1 are due to the motion of scene elements in the video, $T_{mott3}$ denoting yet another prescribed motion type threshold, and $Percentile_f$ sorting the values of OFRes(f) across all of the frames of the video and then selecting the value of OFRes(f) at the $T_{mott3}$ percentile.

13. The process of claim 9, wherein the determined presentation style comprises a one of the presentation styles in a set of possible presentation styles comprising:
- a rendered video class of presentation styles; and
- a real-world video class of presentation styles.

14. The process of claim 13, wherein the video comprises an educational video, and the rendered video class of presentation styles comprises one or more of:
- a rendered slide show presentation style; or
- a rendered slide show comprising a video of a presenter presentation style; or
- a rendered animation presentation style; or
- a rendered photographs presentation style; or
- a rendered hand-drawn slides presentation style.

15. The process of claim 13, wherein the video comprises an educational video, and the real-world video class of presentation styles comprises one or more of:
- a natural video presentation style; or
- a video of an interview presentation style; or
- a video of handwriting on paper presentation style; or
- a video of projected slides presentation style; or
- a video of a whiteboard presentation style; or
- a video of a blackboard presentation style.

* * * * *